United States Patent [19]

Kawai et al.

[11] Patent Number: 5,502,296

[45] Date of Patent: Mar. 26, 1996

[54] METHOD OF AND APPARATUS FOR DEMODULATING BAR CODE

[75] Inventors: Hiroaki Kawai; Mitsuo Watanabe; Shinichi Sato; Ichiro Shinoda; Motohiko Itoh, all of Kawasaki, Japan

[73] Assignee: Fujitsu Limited, Kawasaki, Japan

[21] Appl. No.: 310,045

[22] Filed: Sep. 21, 1994

[30] Foreign Application Priority Data

| Dec. 20, 1993 | [JP] | Japan | 5-320145 |
| Aug. 5, 1994 | [JP] | Japan | 6-184972 |

[51] Int. Cl.⁶ .................................................. G06K 7/10
[52] U.S. Cl. ............................................................... 235/462
[58] Field of Search ................................ 235/454, 465, 235/462, 472, 494

[56] References Cited

U.S. PATENT DOCUMENTS

| 4,323,772 | 4/1982 | Serge | 235/463 |
| 5,166,500 | 11/1992 | Yoon et al. | 235/463 |
| 5,194,720 | 3/1993 | Reinnagel et al. | 235/463 X |
| 5,227,616 | 7/1993 | Lee | 235/462 |
| 5,245,167 | 9/1993 | Takenaka | 235/463 X |
| 5,393,968 | 2/1995 | Watanabe et al. | 235/462 |

FOREIGN PATENT DOCUMENTS

| 0152733 | 8/1985 | European Pat. Off. | 235/462 |
| 1290092 | 11/1989 | Japan | 235/462 |
| 1417439 | 7/1973 | United Kingdom . |
| 1528381 | 10/1975 | United Kingdom . |
| 1604063 | 3/1978 | United Kingdom . |
| 1602804 | 5/1978 | United Kingdom . |

*Primary Examiner*—Donald T. Hajec
*Assistant Examiner*—Thien Minh Le
*Attorney, Agent, or Firm*—Armstrong, Westerman, Hattori, McLeland & Naughton

[57] ABSTRACT

An apparatus for demodulating bar codes is disclosed. In this apparatus of this invention, a distortion quantity calculation unit for calculates a distortion quantity of a bar width of a character to be demodulated by use of bar code data generated by reading the bar codes in which characters are expressed by bar widths. A distortion quantity determining unit determines whether or not a bar width distortion quantity calculated by the distortion quantity calculation unit falls within a range of predetermined values. A first demodulation unit, when determining that the distortion quantity of the bar width falls within the range of the predetermined values, demodulates the character from the bar code data by effecting a first correcting process on the bar width distortion quantity. A second demodulation unit, when determining that the distortion quantity of the bar width does not fall within the range of the predetermined values, demodulates the character from the bar code data by effecting a second correcting process on the distortion quantity of the bar width.

25 Claims, 32 Drawing Sheets

FIG.10

| T1\T2 | 2 | 3 | 4 | 5 |
|---|---|---|---|---|
| 2 | E6 | O0 | E4 | O3 |
| 3 | O9 | E2 / O1<br>E8 / O7 | | E5 |
| 4 | E9 | O2 / E1<br>O8 / E7 | | O5 |
| 5 | O6 | E0 | O4 | E3 |

FIG.11

| B1\B3 | 1 | 2 | 3 |
|---|---|---|---|
| 1 | E7<br>E8 | O1 | — |
| 2 | O2 | E1<br>E2 | O7 |
| 3 | — | O8 | — |

FIG. 20A

| x-BAR MODULE | b-BAR MODULE | RESULT OF CHECK |
|---|---|---|
| 1.5 | 1.5 | CORRECTION OK |
|  | 1.4 |  |
|  | 1.3 |  |
|  | 1.2 |  |
|  | 1.1 | CORRECTION GRAY ZONE & DIRECT DEMODULATION OK |
|  | 1.0 |  |
|  | 0.9 |  |
|  | 0.8 |  |
|  | 0.7 | CORRECTION NG |
|  | 0.6 |  |
|  | 0.5 |  |

FIG. 20B

| x-BAR MODULE | b-BAR MODULE | RESULT OF CHECK |
|---|---|---|
| 1.3 | 1.5 | CORRECTION OK |
|  | 1.4 |  |
|  | 1.3 |  |
|  | 1.2 |  |
|  | 1.1 |  |
|  | 1.0 |  |
|  | 0.9 | CORRECTION GRAY ZONE & DIRECT DEMODULATION OK |
|  | 0.8 |  |
|  | 0.7 |  |
|  | 0.6 |  |
|  | 0.5 | CORRECTION NG |

FIG.20C

| x-BAR MODULE | b-BAR MODULE | RESULT OF CHECK |
|---|---|---|
| 1.0 | 1.5 | CORRECTION GRAY ZONE & DIRECT DEMODULATION OK |
| | 1.4 | |
| | 1.3 | CORRECTION OK |
| | 1.2 | |
| | 1.1 | |
| | 1.0 | |
| | 0.9 | |
| | 0.8 | |
| | 0.7 | |
| | 0.6 | CORRECTION GRAY ZONE & DIRECT DEMODULATION OK |
| | 0.5 | |

FIG.20D

| x-BAR MODULE | b-BAR MODULE | RESULT OF CHECK |
|---|---|---|
| 0.7 | 1.5 | CORRECTION NG |
| | 1.4 | CORRECTION GRAY ZONE & DIRECT DEMODULATION OK |
| | 1.3 | |
| | 1.2 | |
| | 1.1 | |
| | 1.0 | CORRECTION OK |
| | 0.9 | |
| | 0.8 | |
| | 0.7 | |
| | 0.6 | |
| | 0.5 | |

FIG. 20E

| x-BAR MODULE | b-BAR MODULE | RESULT OF CHECK |
|---|---|---|
| 0.5 | 1.5 | CORRECTION NG |
|  | 1.4 |  |
|  | 1.3 |  |
|  | 1.2 | CORRECTION GRAY ZONE & DIRECT DEMODULATION OK |
|  | 1.1 |  |
|  | 1.0 |  |
|  | 0.9 |  |
|  | 0.8 | CORRECTION OK |
|  | 0.7 |  |
|  | 0.6 |  |
|  | 0.5 |  |

METHOD OF AND APPARATUS FOR DEMODULATING BAR CODE

BACKGROUND OF THE INVENTION

The present invention relates to a bar code demodulating method of and a bar code demodulating apparatus for demodulating a character from bar code data generated by reading bar codes in which characters are expressed by bar widths.

For quickly grasping sales contents of articles, a POS (Point Of Sales) system is on the verge of spreading in supermarkets and department stores. The POS system incorporates a bar code scanner.

The bar code scanner is a device for reading the bar codes printed on a label or a price tag of an article. The bar codes are formed such that characters such as numerals are expressed by bar widths.

The bar code scanner scans the bar codes with laser beams. The bar code scanner reads bar code data from the light of beams reflected by the bar codes. Then, the bar code scanner measures each bar widths of the bar code data and encodes the bar code data into '1' and '0'.

The bar code scanner demodulates the character from coded items of bar code data by use of a demodulation table. That is, the bar code scanner includes a bar code demodulating apparatus and obtains the characters corresponding to the bar codes thereof.

In the above bar code scanner, standard codes are established as JAN (Japanese Article Number) code symbols. The bar codes have a left block representing an article maker code and a right block indicating an article item code. Right-and-left guard bars are provided at marginal portions of the right and left blocks, and a center bar is formed between the right and left blocks.

Further, the left block consists of an odd parity in which a sum of coded '1' is an odd-number and an even parity in which a sum of coded '1' is an even-number. The right block consists of the even parity. The bar code scanner reads the bar codes sequentially from the left guard bar up to the right guard bar in the right direction.

One character is composed of four elements such as a white element, a black element, a white element and a black element and, at the same time, consists of seven modules.

Hence, the numerals from '0' to '9' are expressed by the seven modules with the aid of the white and black elements. In this case, the white element is encoded into '0', while the black element is encoded into '1'.

Each of an odd parity O and an even parity E of the left block and the even parity E of the right block is expressed by any one of the numerals from '0' to '9'.

For instance, the even parity E of the numeral '4' is composed of, sequentially from the left end, 2 modules (white element), 3 modules (black element), 1 module (white element) and 1 module (black element). A number of modules of the black elements is '4', i.e., an even-number.

The even parity E of the numeral '6' is composed of, sequentially from the left end, 4 modules (white element), 1 module (black element), 1 module (white element and 1 module (black element). The number of modules of the black elements is '2', viz., an even-number.

In this case, the bar code demodulating apparatus obtains a delta distance T1 with respect to the even parity E of the numeral '6' to be demodulated. The delta distance T1 is a distance from the first black module at the right end up to the first white module adjacent thereto. The number of modules of the delta distance T1 is 2.

Next, the bar code demodulating apparatus obtains a delta distance T2 with respect to the even parity E of the numeral '6'. The delta distance T2 is a distance from the first white module up to the second black module adjacent thereto. The number of modules of the delta distance T2 is 2.

The bar code demodulating apparatus demodulates the numeral '6' with reference to a distance demodulation table in which the numerical values of the delta distances T1 and T2 correspond to the numerals to be demodulated.

The even parity E (hereinafter termed E2) of the numeral '2' is composed of 2 modules (white element), 2 modules (black element), 1 module (white element) and 2 modules (black element). Both of the delta distances T1 and T2 are 3.

Further, the even parity E (hereinafter termed E8) of the numeral '8' is composed of 3 modules (white element), 1 module (black element), 2 modules (white element) and 1 module (black element).

Both of the delta distances are 3. The delta distances T1 and T2 of both of the even parity E2 and the even parity E8 have the same value.

For this reason, the bar code demodulating apparatus is incapable of distinguishing the even parity E2 from the even parity E8 even by using the distance demodulation table. Also, the bar code demodulating apparatus is incapable of making distinctions, in addition to the above-mentioned, between an odd parity O2 and an odd parity O8, between an odd parity O1 and an odd parity O7 and between an even parity E1 and an even parity E7.

Accordingly, for distinguishing, e.g., the even parity E2 from the even parity E8, the bar code demodulating apparatus obtains the number of black modules with respect to each parity. The number of modules of each of the black elements B1 and B3 of the even parity E2 is 2. The number of modules of each of the black elements B1 and B3 of the even parity E8 is 1.

Herein, the number of black modules of the even parity E8 is different from the number of black modules of the even parity E2. Namely, the bar code demodulating apparatus makes the distinction between the even parity E2 and the even parity E8 with reference to a bar width demodulation table in which the number of modules of the black elements B1 and B3 correspond to the numerals to be demodulated.

Further, the bar codes become thick or thin on the whole due to an error in printing as the case may be. For example, when an optical system is employed for the bar code scanner, a black bar of the bar code is thickened. In general, the black bar and a white bar adjacent thereto are uniformly thickened or thinned.

Particularly, when the numeral is any one of 1, 2, 7 and 8, and if a distortion is produced in the bar width, an accuracy of reading the bar codes declines. For this reason, the bar code demodulating apparatus calculates a difference between a bar width of the character to be demodulated and a bar width of the demodulated character just before the to-be-demodulated character. The printing error is eliminated by the difference between the bar widths.

Also, the bar code demodulating apparatus calculates the number of modules of the difference between the bar widths and adds the number of modules of the bar width of the already-demodulated character to the number of modules of the above difference. With this processing, an ideal number of modules of the bar width of the character to be demodulated is calculated.

That is, if the numeral is any one of 1, 2, 7 and 8, the bar code demodulating apparatus demodulates the character by correcting, as a first correcting process, the bar code by use of the just-before already-demodulated character.

Based on the correcting method according to the prior art, however, if a print quality of the bar code data worsens to some extent, it happens that the bar code is mistakenly read or can not be read.

As discussed above, if it is known that the print quality of the bar code data is, more or less, poor, a dip switch switches over the first correcting process to a second correcting process. The bar code demodulating apparatus demodulates the character by correcting, as the second correcting process, the bar code by use of a length of the to-be-demodulated character.

The bar code demodulating apparatus, however, corrects the bar code data by effecting one of the two correcting processes. For this reason, if the print quality differs per bar code data, the bar code demodulating apparatus is incapable of correcting all the bar code data.

Accordingly, there has been desired a bar code demodulating apparatus capable of reading the bar code without any misread by automatically switching over the correcting processes, even if the bar codes exhibit a comparatively low print quality.

SUMMARY OF THE INVENTION

It is a primary object of the present invention to provide a bar code demodulating method and a bar code demodulating apparatus that are capable of improving an accuracy of reading bar codes.

A bar code demodulating apparatus according to the present invention comprises a distortion quantity calculation unit, a distortion determining unit, a first demodulation unit and a second demodulation unit. The distortion quantity calculation unit calculates a distortion quantity of a bar width of a character to be demodulated by use of bar code data generated by reading the bar codes in which characters are expressed by bar widths. The distortion quantity determining unit determines whether or not a bar width distortion quantity calculated by the distortion quantity calculation unit falls within a range of predetermined values. The first demodulation unit, when the distortion quantity determining unit determines that the distortion quantity of the bar width falls within the range of the predetermined values, demodulates the character from the bar code data by effecting a first correcting process on the bar width distortion quantity.

The second demodulation unit, when the distortion quantity determining unit determines that the distortion quantity of the bar width does not fall within the range of the predetermined values, demodulates the character from the bar code data by effecting a second correcting process on the distortion quantity of the bar width.

The bar code demodulating apparatus according to the present invention is constructed of the above indispensable components. The components thereof may be specifically the following components.

The bar code demodulating apparatus may include a distance demodulation table. The bar code is composed of plural items of white bar data and plural items of black bar data. The distance demodulation table demodulates only a character exclusive of specified characters on the basis of a distance between an item of white bar data and an item of black bar data, which are adjacent to each other, of the bar code data. The distortion quantity calculation unit inputs the bar code data of the specified characters.

The bar code demodulating apparatus may include an optical device, an A/D converter, a clock generator for generating clock signals, a bar width counter and a memory. The optical device irradiates the bar codes with the light. The A/D converter generates the bar code data by effecting a binary-coding process on the light reflected by the bar codes.

The bar width counter counts a bar width of the bar code data outputted from the A/D converter by use of the clock signals. The memory stores bar width count values counted by the bar width counter.

The distortion quantity calculation unit may calculate a distortion quantity of the bar width of the to-be-demodulated on the basis of the bar width of the already-demodulated character immediately in front of the to-be-demodulated character.

The first demodulation unit may demodulate the character by correcting the distortion quantity of the bar width on the basis of the bar width of the already-demodulated character just before the to-be-demodulated character.

The second demodulation unit may demodulate the character by correcting the distortion quantity of the bar width on the basis of the bar width of the to-be-demodulated character.

The second demodulation unit may measure a distortion quantity of the bar width of the to-be-demodulated character and, if this distortion quantity falls within the range of the predetermined values, demodulate the character.

Further, the bar code demodulating apparatus may include a first confirmation unit. The first confirmation unit, when the first demodulation unit demodulates the character just before the to-be-demodulated character exhibiting no distortion, reconfirms the just-before demodulated character by use of the to-be-demodulated character with no distortion.

The bar code demodulating apparatus may also comprise a second confirmation unit. The second confirmation unit, when the second demodulation unit demodulates the character just before the to-be-demodulated character exhibiting no distortion, reconfirms the just-before demodulated character by use of the to-be-demodulated character with no distortion.

The distortion quantity calculation unit calculates, as a distortion quantity, a difference between the bar width of the just-before already-demodulated character and the bar width of the to-be-demodulated character. The distortion quantity calculation unit then obtains a module value by dividing this distortion quantity by module widths constituting the character.

The distortion determining unit, when the module value is within upper/lower limit module values of a predetermined fiducial module value, determines that the distortion quantity falls within the range of the predetermined values.

Further, the distortion quantity calculation unit calculates the distortion quantity of the bar width of the to-be-demodulated character. The distortion quantity calculation unit calculates the distortion quantity of the bar width of the demodulated character just before the to-be-demodulated character. The distortion quantity determining unit determines positive/negative signs of the distortion quantity, calculated by the distortion quantity calculation unit, of the bar width of the to-be-demodulated character and of the distortion quantity, calculated by the distortion quantity calculation unit, of the bar width of the just-before demodulated character.

The first demodulation unit, when the distortion quantity of the bar width of the to-be-demodulated character and the distortion quantity of the bar width of the just-before demodulated character have the same positive/negative signs, demodulates the character by correcting the distortion quantity of the bar width of the to-be-demodulated character on the basis of the bar width of the just-before demodulated character.

The second demodulation unit, when the distortion quantity of the bar width of the to-be-demodulated character and the distortion quantity of the bar width of the just-before demodulated character have different positive/negative signs, demodulates the character by correcting the distortion quantity of the bar width thereof on the basis of the bar width of the to-be-demodulated character.

Further, the distortion quantity calculation unit calculates the distortion quantity of the bar width of the to-be-demodulated character and, at the same time, calculates the distortion quantity of the bar width of the demodulated character just before the to-be-demodulated character.

The distortion quantity determining unit determines whether or not a difference in terms of bar width distortion quantity between the distortion quantity, calculated by the distortion quantity calculation unit, of the bar width of the to-be-demodulated character and the distortion quantity, calculated by the distortion quantity calculation unit, of the bar width of the just-before demodulated character falls within the range of the predetermined values.

The first demodulation unit, when the difference between the bar width distortion quantities falls within the range of the predetermined values, demodulates the character by correcting the distortion quantity of the bar width of the to-be-demodulated character on the basis of the bar width of the just-before demodulated character.

The second demodulation unit, when the difference between the bar width distortion quantities does not fall within the range of the predetermined values, demodulates the character by correcting the distortion quantity of the bar width thereof on the basis of the bar width of the to-be-demodulated character.

Bar Code Demodulating Method of This Invention

Also, a bar code demodulating method comprises a distortion quantity calculating step, a distortion quantity determining step, a first demodulating step and a second demodulating step.

The distortion quantity calculating step is to calculate a distortion quantity of a bar width of a character to be demodulated by use of bar code data generated by reading the bar codes in which characters are expressed by bar widths.

The distortion quantity determining step is to determine whether or not a bar width distortion quantity calculated in the distortion quantity calculating step falls within a range of predetermined values. The first demodulating step is, when determining that the distortion quantity of the bar width falls within the range of the predetermined values in the distortion quantity determining step, to demodulate the character from the bar code data by effecting a first correcting process on the bar width distortion quantity.

The second demodulating step is, when determining that the distortion quantity of the bar width does not fall within the range of the predetermined values in the distortion quantity determining step, to demodulate the character from the bar code data by effecting a second correcting process on the distortion quantity of the bar width.

The bar code demodulating method according to the present invention comprises the above indispensable steps, but those steps may be specifically the following steps.

The bar code is composed of plural items of white bar data and plural items of black bar data. The bar code demodulating method includes a distance demodulating step of demodulating only a character exclusive of specified characters on the basis of a distance between an item of white bar data and an item of black bar data, which are adjacent to each other, of the bar code data. The distortion quantity calculating step involves inputting the bar code data of the specified characters.

The distortion quantity calculating step involves calculating a distortion quantity of the bar width of the to-be-demodulated on the basis of the bar width of the already-demodulated character immediately in front of the to-be-demodulated character.

Further, the first demodulating step involves demodulating the character by correcting the distortion quantity of the bar width on the basis of the bar width of the already-demodulated character just before the to-be-demodulated character.

The second demodulating step involves demodulating the character by correcting the distortion quantity of the bar width on the basis of the bar width of the to-be-demodulated character.

The second demodulating step involves measuring a distortion quantity of the bar width of the to-be-demodulated character and, if this distortion quantity falls within the range of the predetermined values, demodulating the character.

The bar code demodulating method may further comprise a first confirming step. The first confirming step involves reconfirming, when demodulating the character just before the to-be-demodulated character exhibiting no distortion in the first demodulating step, the just-before demodulated character by use of the to-be-demodulated character with no distortion.

The bar code demodulating method may further comprise a second confirming step. The second confirming step involves reconfirming, when demodulating the character just before the to-be-demodulated character exhibiting no distortion in the second demodulating step, the just-before demodulated character by use of the to-be-demodulated character with no distortion.

The distortion quantity calculating step involves calculating, as a distortion quantity, a difference between the bar width of the just-before already-demodulated character and the bar width of the to-be-demodulated character. The distortion quantity calculating step also involves obtaining a module value by dividing this distortion quantity by module widths constituting the character.

The distortion determining step involves, when the module value is within upper/lower limit module values of a predetermined fiducial module value, determining that the distortion quantity falls within the range of the predetermined values.

The distortion quantity calculating step involves calculating a distortion quantity of the bar width of the to-be-demodulated character and, at the same time, calculating a distortion quantity of the bar width of the demodulated character just before the to-be-demodulated character. The distortion quantity determining step involves determining positive/negative signs of the calculated distortion quantity of the bar width of the to-be-demodulated character and of the calculated distortion quantity of the bar width of the just-before demodulated character.

The first demodulating step involves, when the distortion quantity of the bar width of the to-be-demodulated character and the distortion quantity of the bar width of the just-before demodulated character have the same positive/negative signs, demodulating the character by correcting the distortion quantity of the bar width of the to-be-demodulated character on the basis of the bar width of the just-before demodulated character.

The second demodulating step involves, when the distortion quantity of the bar width of the to-be-demodulated character and the distortion quantity of the bar width of the just-before demodulated character have different positive/negative signs, demodulating the character by correcting the distortion quantity of the bar width thereof on the basis of the bar width of the to-be-demodulated character.

Further, the distortion quantity calculating step involves calculating the distortion quantity of the bar width of the to-be-demodulated character and, at the same time, calculating the distortion quantity of the bar width of the demodulated character just before the to-be-demodulated character.

The distortion quantity determining step involves determining whether or not a difference in terms of the bar width distortion quantity between the calculated distortion quantity of the bar width of the to-be-demodulated character and the calculated distortion quantity of the bar width of the just-before demodulated character falls within the range of the predetermined values.

The first demodulating step involves, when the difference between the bar width distortion quantities falls within the range of the predetermined values, demodulating the character by correcting the distortion quantity of the bar width of the to-be-demodulated character on the basis of the bar width of the just-before demodulated character.

The second demodulating step involves, when the difference between the bar width distortion quantities does not fall within the range of the predetermined values, demodulating the character by correcting the distortion quantity of the bar width thereof on the basis of the bar width of the to-be-demodulated character.

According to the present invention, the distortion quantity calculation unit calculates the distortion quantity of the bar width of the to-be-demodulated character by use of the bar code data. Hereat, the distortion quantity determining unit determines whether or not the calculated distortion quantity of the bar width falls within the range of the predetermined values.

If it is determined that the distortion quantity of the bar width falls within the range of the predetermined values, the first demodulation unit demodulates the character from the bar code data by performing the first correcting process on the bar width distortion quantity thereof.

Whereas if it is determined that the distortion quantity of the bar width does not fall within the range of the predetermined values, the second demodulation unit demodulates the character from the bar code data by performing the second correcting process on the bar width distortion quantity thereof.

As mentioned above, the bar code demodulating apparatus automatically carries out the first or second demodulating process in accordance with a magnitude of the distortion quantity of the bar width per bar code. Accordingly, it is possible to improve the accuracy of reading the bar codes.

Further, the first or second demodulating process is automatically conducted depending on whether the bar width distortion quantities of the to-be-demodulated character and of the just-before demodulated character have the same or different positive/negative signs. Hence, the accuracy of reading the bar codes can be enhanced.

Moreover, the first or second demodulating process is automatically effected depending on the difference in terms of bar width distortion quantity between the bar width distortion quantity of the to-be-demodulated character and the bar width distortion quantity of the just-before demodulated character. Therefore, the accuracy of reading the bar codes can be ameliorated.

BRIEF DESCRIPTION OF THE DRAWINGS

Other objects and advantages of the present invention will become apparent during the following discussion in conjunction with the accompanying drawings, in which:

FIG. 10 is diagram showing a distance demodulation table;

FIG. 11 is a diagram showing a bar width demodulation table;

FIG. 20A is a diagram showing a result of demodulating a character when a bar width x of a just-before character is 1.5 in the embodiment 4; FIG. 20B is a diagram showing a result of demodulating the character when the bar width x of the just-before character is 1.3; FIG. 20C is a diagram showing a result of demodulating the character when the bar width x of the just-before is 1.0; FIG. 20D is a diagram showing a result of demodulating the character when the bar width x of the just-before character is 0.7; FIG. 20E is a diagram showing a result of demodulating the character when the bar width x of the just-before character is 0.5;

DETAILED DESCRIPTION OF THE PREFERRED EMBODIMENTS

The present invention will hereinafter be discussed by way of specific embodiments.

Embodiment 1

Figure 1:
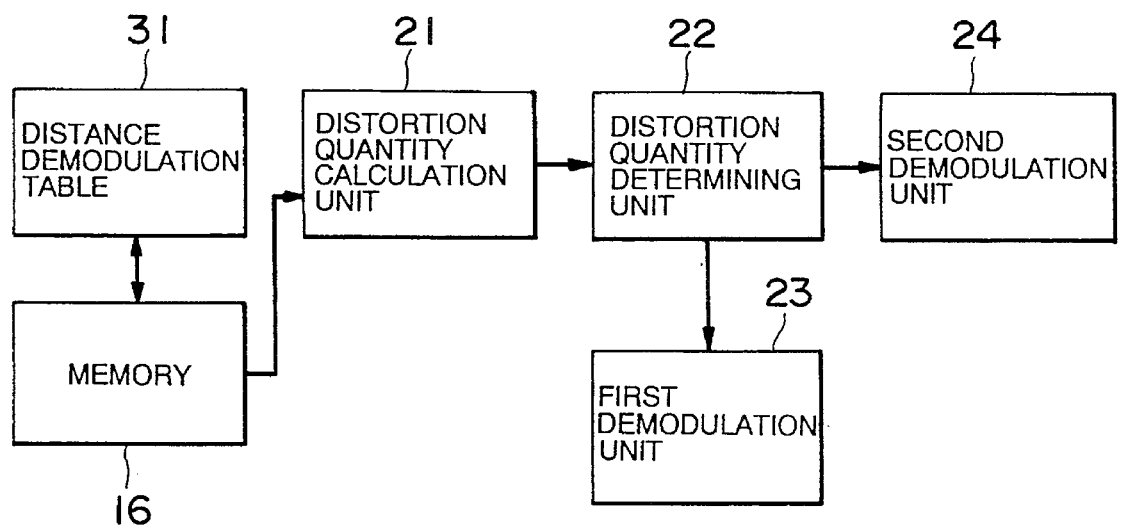
FIG. 1 is a block diagram illustrating a construction of a bar code demodulating apparatus in accordance with an embodiment 1 of this invention.

FIG. 1 is a block diagram illustrating a construction of a bar code demodulating apparatus in accordance with an embodiment 1 of the present invention. The bar code demodulating apparatus demodulates a character from bar code data generated by reading bar codes in which characters are expressed by bar widths. The bar code data consists of plural pieces of white bar data and plural pieces of black bar data.

The bar code demodulating apparatus includes a memory 16, a distance demodulation table 31, a distortion quantity calculation unit 21, a distortion quantity determining unit 22, a first demodulation unit 23 and a second demodulation unit 24.

The distortion quantity calculation unit 21, the distortion quantity determining unit 22, the first demodulation unit 23 and the second demodulation unit 24 are defined as functions realized by an unillustrated central processing unit executing programs stored in the memory 16.

The memory 16 stores the bar code data. The distance demodulation table 31 and the distortion quantity calculation unit 21 are connected to the memory 16.

The distance demodulation table 31 functions to demodulate only characters exclusive of specified characters on the basis of a distance between the white bar data and the black bar data, which are adjacent to each other, of the bar code data. Herein, the specified characters are numerals such as 1, 2, 7 and 8.

The distortion quantity calculation unit 21 inputs the bar code data of the specified characters from the memory 16.

The distortion quantity calculation unit 21 calculates bar width distortion quantities of the specified characters to be demodulated by use of the bar code data. The distortion quantity determining unit 22 is connected to the distortion quantity calculation unit 21.

The distortion quantity determining unit 22 determines whether or not the bar width distortion quantity calculated by the distortion quantity calculation unit 21 falls within a range of predetermined values. Connected to the distortion quantity determining unit 22 are the first demodulation unit 23 and the second demodulation unit 24.

If the distortion quantity determining unit 22 determines that the bar width distortion quantity falls within the range of the predetermined values, the first demodulation unit 23 performs a first correcting process with respect to the bar width distortion quantity and thereby demodulates the above-mentioned character from the bar coder data.

Whereas if the distortion quantity determining unit 22 determines that the bar width distortion quantity does not fall within the range of the predetermined values, the second demodulation unit 24 performs a second correcting process with respect to the bar width distortion quantity and thereby demodulates the above character from the bar code data.

Figure 2:
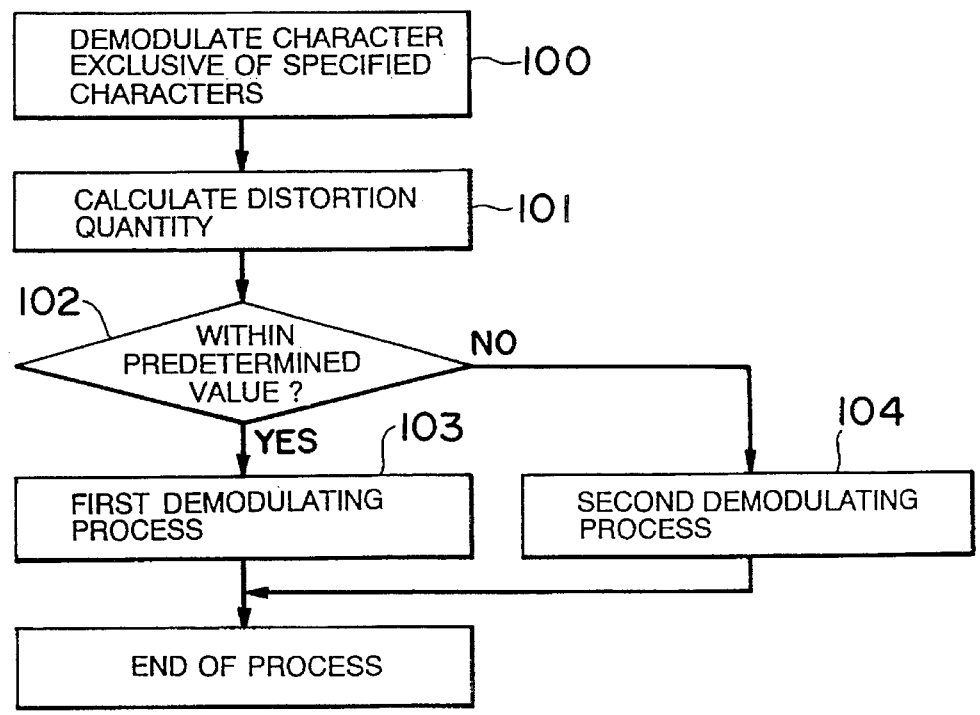
FIG. 2 is a flowchart showing a bar code demodulating method in accordance with the embodiment 1 of this invention.

Next, a bar code demodulating method in the embodiment 1 will be described with reference to FIG. 2. To start with, the bar code data stored in the memory 16 is inputted to the distance demodulation table 31. The distance demodulation table 31 functions to demodulate only the characters other than the specified characters on the basis of the distance between the adjacent items of white and black bar data of the bar code data. That is, the characters exclusive of 1, 2, 7 and 8 are demodulated (step 100).

Subsequently, the distortion quantity calculation unit 21 inputs the bar code data of the specified characters from the memory 16. The distortion quantity calculation unit 21 calculates the bar width distortion quantities of the specified characters to be demodulated by use of the bar code data (step 101). Then, the distortion quantity determining unit 22 determines whether or not the bar width distortion quantity calculated by the distortion quantity calculation unit 21 falls within the range of the predetermined values (step 102).

Herein, if the distortion quantity determining unit 22 determines that the bar width distortion quantity falls within the range of the predetermined values, the first demodulation unit 23 performs the first correcting process with respect to the bar width distortion quantity and thereby demodulates the above character from the bar code data. That is, the first demodulation unit 23 carries out a first demodulating process (step 103).

Whereas if the distortion quantity determining unit 22 determines that the bar width distortion quantity does not fall within the range of the predetermined values, the second demodulation unit 24 performs the second correcting process with respect to the bar width distortion quantity and thereby demodulates the above character from the bar code data. Namely, the second demodulation unit 24 carries out a second demodulating process (step 104).

As discussed above, the bar code demodulating apparatus in the embodiment 1 automatically performs the first demodulating process or the second demodulating process in accordance with a magnitude of the bar width distortion quantity per bar code. Accordingly, an accuracy of reading the bar codes can be improved.

Embodiment 2

Figure 3:
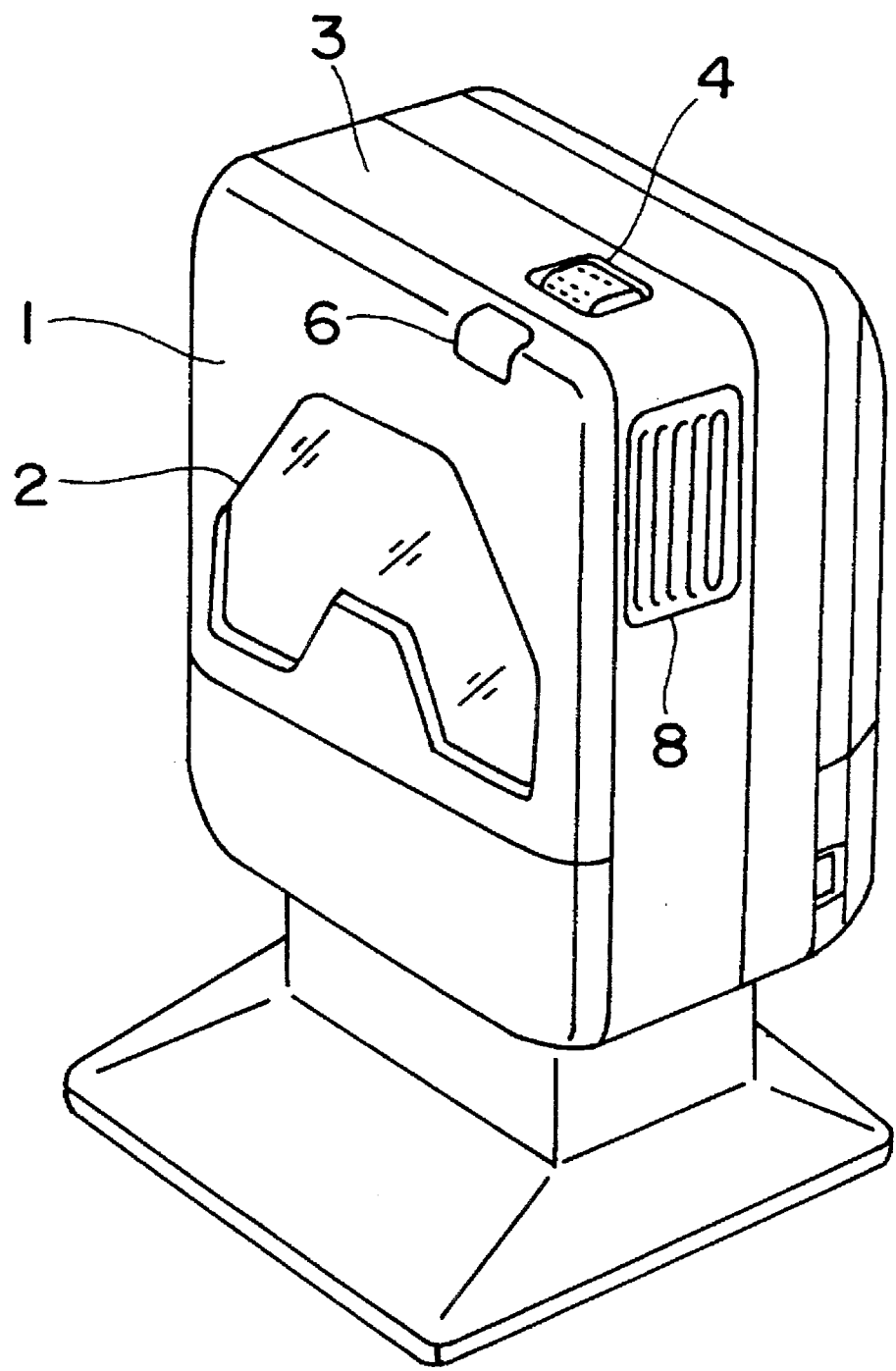
FIG. 3 is a view illustrating an external appearance of the bar code demodulating apparatus in accordance with an embodiment 2 of this invention.

FIG. 3 is a view illustrating an external appearance of the bar code demodulating apparatus according to the present invention. As shown in FIG. 3, a front surface portion 1 of the bar code demodulating apparatus is formed with a reading window 2 and mounted with a light emitting diode 6 for displaying the fact that the bar code is read. A side surface portion 3 is provided with a switch 4 for operating the apparatus and a loudspeaker 8 for giving a notice saying that the bar is read.

The reading window 2, when the unillustrated bar code is irradiated with a laser beam, reads the beam of light reflected from the bar code.

Figure 4:
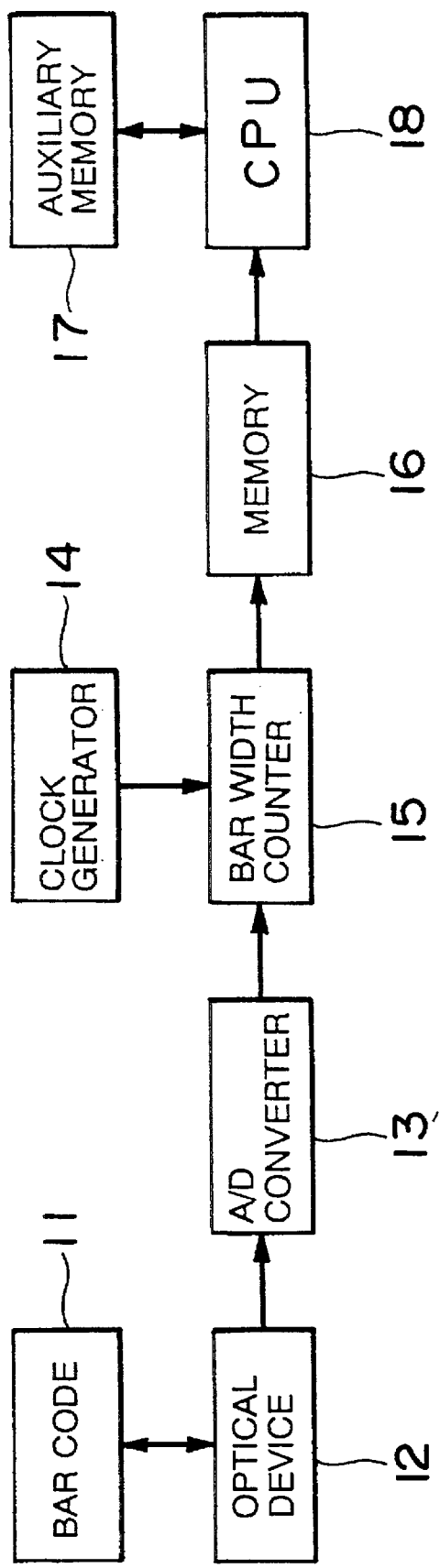
FIG. 4 is a block diagram showing a construction of the bar code demodulating apparatus in accordance with the embodiment 2 of this invention.

FIG. 4 is a block diagram depicting the bar code demodulating apparatus in accordance with an embodiment 2 of this invention. The bar code demodulating apparatus demodulates the character from the bar code data generated by reading the bar code.

The bar code demodulating apparatus has bar codes 11, an optical device 12, an A/D converter 13, a clock generator 14 and a bar width counter 15. The bar code demodulating apparatus further includes the memory 16, an auxiliary memory 17 and a CPU 18.

The bar codes are codes marked on a label of an unillustrated article and composed of bar widths representing characters such as numerals.

Figure 5:
FIG. 5 is a diagram showing one example of bar codes.

The bar codes 11 include, as shown in FIG. 5, e.g., a left block 51 designating an article maker code and a right block 52 representing an article item code. Right and left guard bars 53 and 54 are provided at the edges of the right and left blocks 51 and 52. A center bar 55 is interposed between the right and left blocks 51 and 52.

The bar codes are standardized by code symbols used in JAN (Japan Article Number) or UPC (Universal Product Code) spreading in U.S.A. The bar codes are further standardized by WPC (World Product Code) in the form of bar code symbols that are common over the world or by EAN (European Article Number) spreading in Europe.

Figure 6:
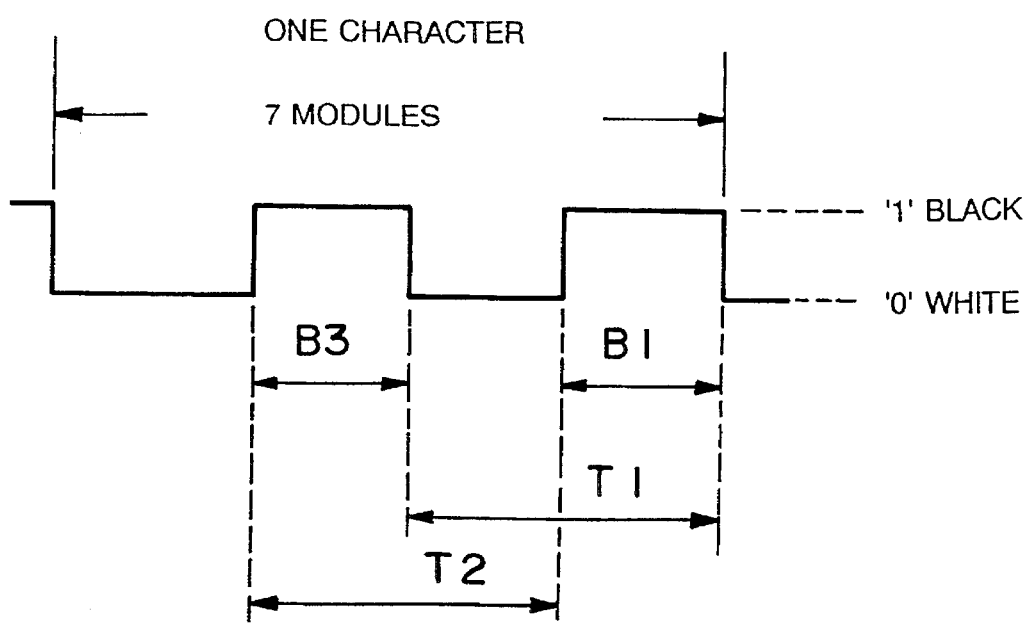
FIG. 6 is a diagram showing a module structure of one character.

FIG. 6 is a diagram illustrating a module structure of one character. Referring to FIG. 6, one character is composed of four elements of, sequentially from the left end, a white element, a black element B3, a white element and a black element B1 and, at the same time, consists of seven modules. Numerals from '0' to '9' are expressed by the seven modules by using the white and black elements. In this case, the white elements are encoded into '0'. The black elements B1 and B3 are encoded into '1'.

The above optical device 12 scans the bar codes 11 with the laser beams and inputs the laser beams reflected from the bar codes 11.

The A/D converter 13 converts, into digital data, analog data based on the bar codes 11 inputted from the optical device 12. More specifically, the A/D converter 13 performs a binary-coding process of '0' and '1' with respect to the laser beams transmitted from the optical device 12, thereby generating the bar code data.

The clock generator 14 generates clock data serving as a fiducial item of data. The bar width counter 15 is connected to the clock generator 14 and the A/D converter 13. The bar width counter 15 measures a bar width of each of the four elements of the bar code data on the basis of the clock data generated in the clock generator 14. The memory is connected to the bar width counter 15.

The memory 16 stores the data on the measured bar widths of the respective elements. The CPU 18 controls the memory 16 and, at the same time, executes a character demodulation program stored in the auxiliary memory 17 after reading this program.

Figure 7:
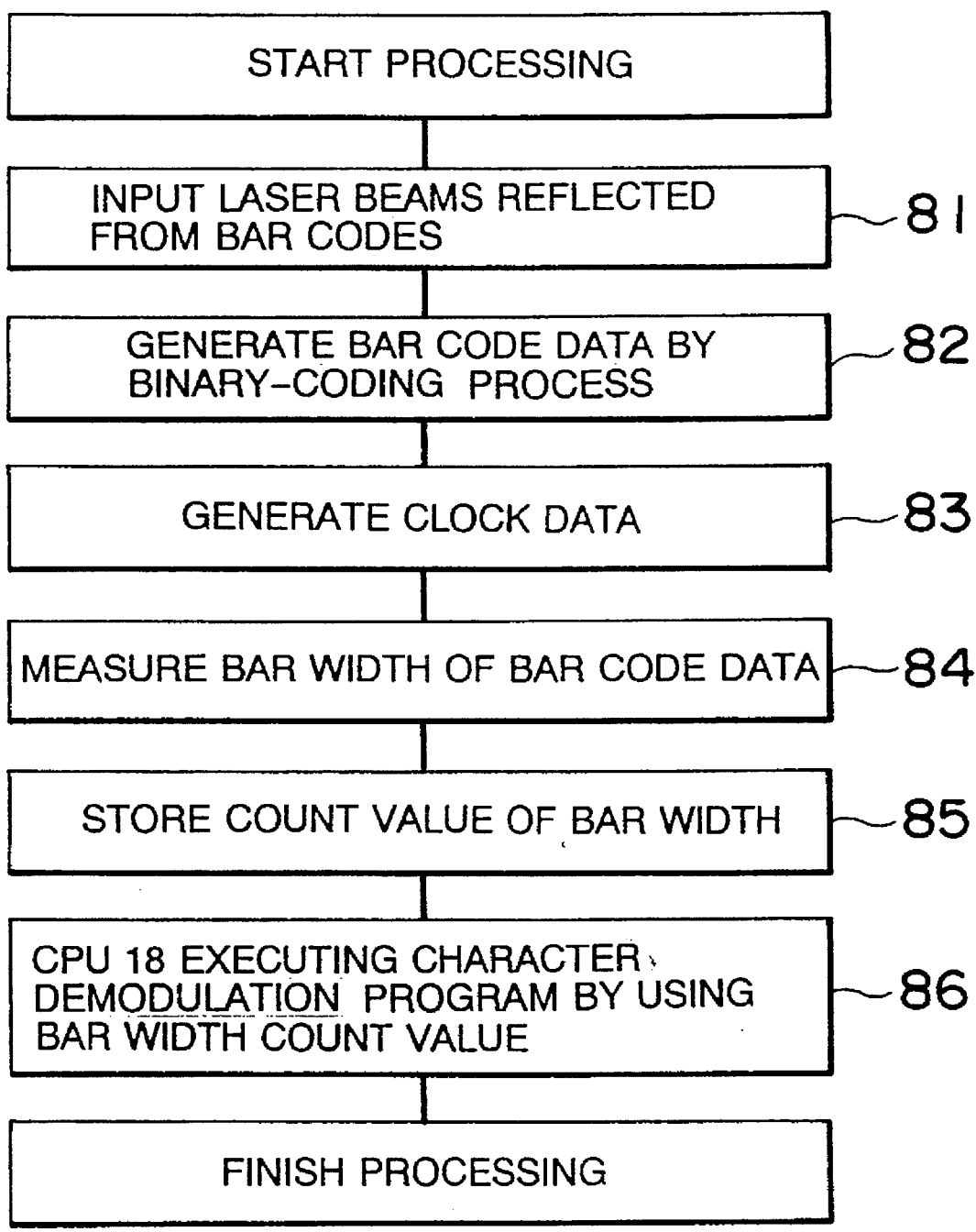
FIG. 7 is a flowchart showing how the bar code demodulating apparatus in the embodiment 2 of this invention reads the bar codes.

Given next is an explanation of how the bar code demodulating apparatus reads the bar codes. FIG. 7 is a flowchart showing the reading process of the bar codes by the bar code demodulating apparatus.

First, the optical device 12 scans the bar codes 11 as shown, e.g., FIG. 5 with the laser beams, ranging from the left guard bar 53 to the right guard bar 54. The optical device 12 inputs the laser beams reflected from the bar codes 11 (step 81). Note that the optical device 12 may scan the bars from the right guard bar 54 to the left guard bar 53 with the laser beams.

Next, the A/D converter 13 effects the binary-coding process of '0' and '1' with respect to the laser beams transmitted from the optical device 12 and thereby generates the bar code data (step 82). For example, the A/D converter 13 generates the bar code data based on the seven modules consisting of '0' and '1' with respect to one character as illustrated in FIGS. 8A through 8D.

Figure 8A:
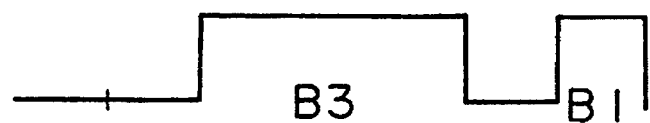
FIG. 8A is a diagram showing an item of bar code data of an even parity E4.
Figure 8B:
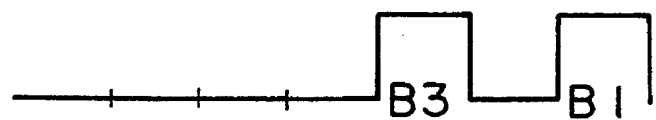
FIG. 8B is a diagram showing an item of bar code data of an even parity E6.
Figure 8C:
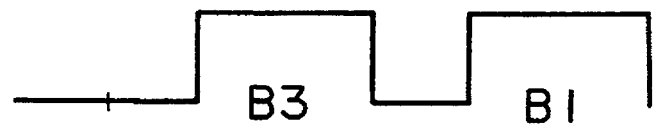
FIG. 8C is a diagram showing an item of bar code data of an even parity E2.
Figure 8D:
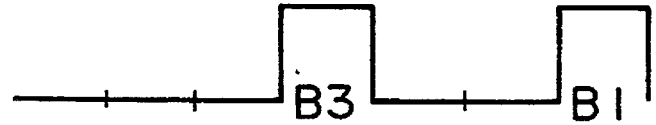
FIG. 8D is a diagram showing an item of bar code data of an even parity E8.

Herein, the bar code data shown in FIG. 8A is the above even parity E4 data which has already been explained in the prior art. The bar code data shown in FIG. 8B is the even parity E6 data. The bar code data shown in FIG. 8C is the even parity E2 data. The bar code data shown in FIG. 8D is the even parity E8 data.

The clock generator 14 generates the clock data serving as a fiducial item of data (step 83). The bar width counter 15 measures the bar width of each of the four elements of the bar code data on the basis of the clock data generated in the clock generator 14 (step 84).

For instance, in the bar code data shown in FIG. 8A, the bar width B1 has one module, and the bar width B3 has 3 modules. When one module indicates 100 clocks, the bar width B1 corresponds to a count of 100 clocks. The bar width B3 corresponds to a count of 300 clocks. The memory 16 stores count values of the measured bar widths of the respective elements (step 85).

The CPU 18 reads the count values of the bar widths of respective items of the bar code data from the memory 16 and, simultaneously, reads a program for a character demodulation from the auxiliary memory 17. The CPU 18 executes the character demodulation program by use of the count values (step 86).

Figure 9:
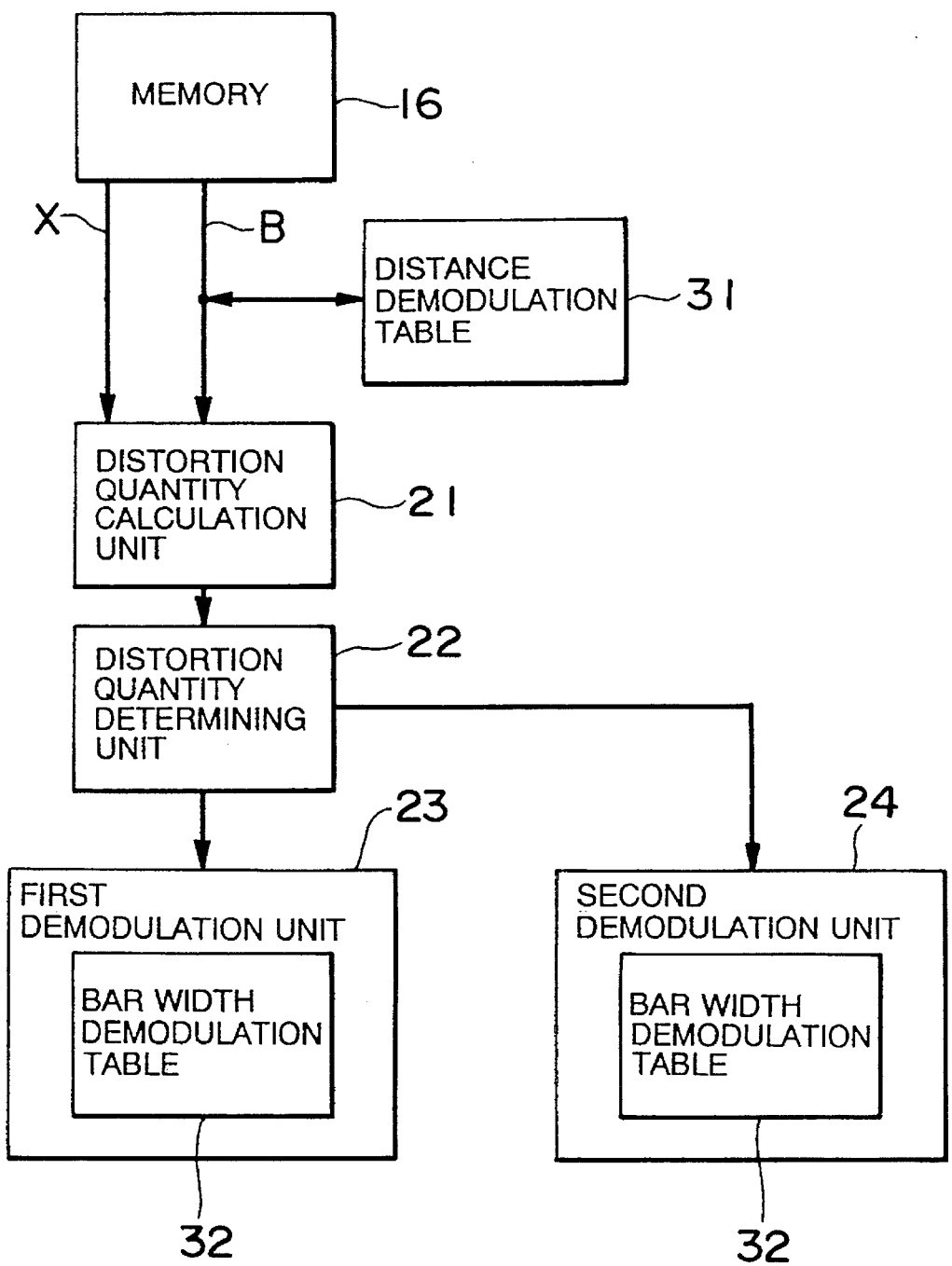
FIG. 9 is a block diagram illustrating a configuration of a character demodulation unit in the embodiment 2.

FIG. 9 is a block diagram illustrating a construction of a character demodulation unit in the embodiment 2. The character demodulation unit is realized by the CPU 18 executing the character demodulation program.

The character demodulation unit includes the distance demodulation table 31, the distortion quantity calculation unit 21, the distortion quantity determining unit 22, the first demodulation unit 23 and the second demodulation unit 24. The distance demodulation table 31 functions to input the bar code data of the characters to be demodulated from the memory 16. The distance demodulation table 31 is a table in which the number of modules of delta distances T1 and T2 are made corresponding to the characters to be demodulated.

More specifically, the distance demodulation table 31 functions to demodulate numerals exclusive of 1, 2, 7 and 8. As shown in FIG. 10, with respect to, e.g., 1 and 7 within a square of the solid line, the number of modules of the delta distances T1 and T2 have the same value, and, therefore, the distance demodulation table 31 is incapable of demodulating 1 and 7.

Herein, the number of modules of the delta distance T1, as shown in FIG. 6, indicates the number of modules from the first black module B1 at the right end to the first white module adjacent thereto. The number of modules of the delta distance T2 is the number of modules from the first white module to the second black module B3 adjacent thereto.

The distortion quantity calculation unit 21 is connected to the memory 16. When the characters are 1, 2, 7 and 8, the distortion quantity calculation unit 21 reads, from the memory 16, a bar width B of the character to be demodulated and a bar width X of the demodulated character immediately in front of the character to be demodulated.

When the characters to be demodulated are 1, 2, 7 and 8, the distortion quantity calculation unit 21 calculates a distortion quantity of the bar width X of the character to be demodulated on the basis of the bar width X of the just-before already-demodulated character. Herein, the distortion quantity is a difference between the bar width X of the just-before demodulated character and the bar width B of the character to be demodulated.

The distortion quantity determining unit 22 is connected to the distortion quantity calculation unit 21. The distortion quantity determining unit 22 determines whether or not the distortion quantity falls within the previously set range of the predetermined values. The first demodulation unit 23 and the second demodulation unit 24 are connected to the distortion quantity determining unit 22.

If the distortion quantity falls within the range of the predetermined values, the first demodulation unit 23 corrects the distortion quantity of the character to be demodulated on the basis of the bar width of the just-before already-demodulated character, thereby demodulating the character. The first demodulation unit 23 and the second demodulation unit 24 have bar width demodulation tables 32.

In the bar width demodulation table 32, as shown in FIG. 11, the black bar widths B1 and B3 are made corresponding to the characters 1, 2, 7 and 8 to be demodulated. That is, when the character is any one of 1, 2, 7 and 8, the bar width demodulation table 32 demodulates the characters 1, 2, 7 and 8 on the basis of the bar widths B1 and B3.

If the distortion quantity does not fall within the range of the predetermined values, the second demodulation unit 24 corrects the distortion quantity of the bar width of the character to be demodulated and thereby demodulates the character.

Figure 12:
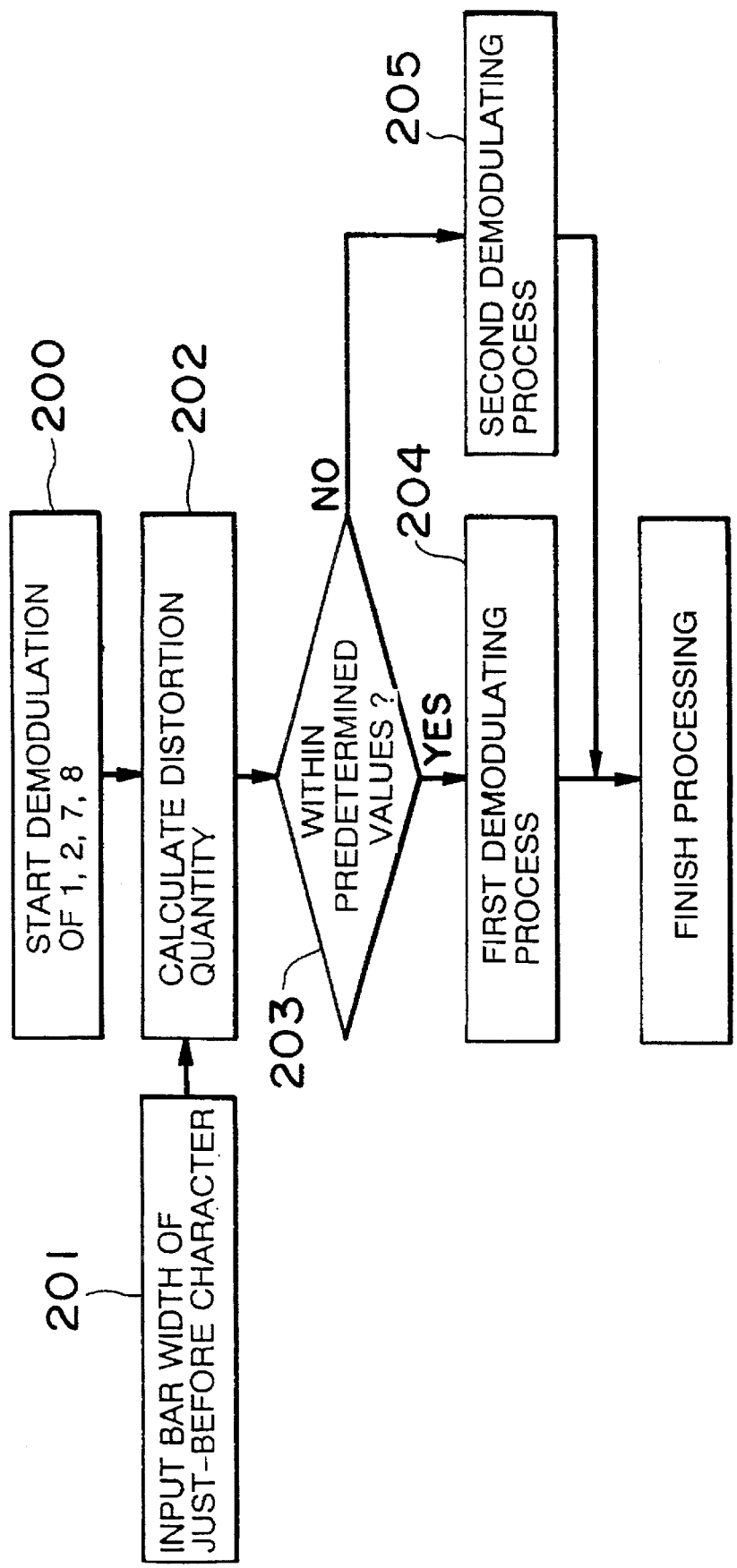
FIG. 12 is a flowchart showing the bar code demodulating method in the embodiment 2 of this invention.

FIG. 12 is a flowchart showing the bar code demodulating method in accordance with the embodiment 2 of this invention.

First, the bar code data of the character to be modulated is inputted from the memory 16 to the distance demodulation table 31. The distance demodulation table 31 shown in FIG. 10 demodulates the numerals exclusive of 1, 2, 7 and 8 on the basis of the number of modules of the delta distances T and T2.

If the character is any one 1, 2, 7 and 8, this character can not be demodulated by employing the distance demodulation table 31. For this reason, the demodulation processing of 1, 2, 7 and 8 is started (step 200).

Next, the distortion quantity calculation unit 21 reads, from the memory 16, the black bar width B of the character to be demodulated and the black bar width X of the already-demodulated character immediately in front of the character to be demodulated (step 201).

Then, if the characters are 1, 2, 7 and 8, the distortion quantity calculation unit 21 calculates the distortion quantities of the characters on the basis of the black bar width X of the just-before already-demodulated character (step 202). The distortion quantity determining unit 22 determines whether or not each of the calculated bar width distortion quantities falls within the range of the predetermined values (step 203).

If the distortion quantity falls within the range of the predetermined values, the first demodulation unit 23 corrects the bar width distortion quantity of the character to be demodulated on the basis of the bar width X of the just-before already-demodulated character and thereby demodulates the character (step 204).

Herein, the characters are 1, 2, 7 and 8, and hence the first demodulation unit 23 demodulates the characters by use of the bar width demodulation table 32 illustrated in FIG. 11.

Whereas if the distortion quantity does not fall within the range of the predetermined values, the second demodulation unit 24 corrects the distortion quantity of the bar width B of the character to be demodulated, thereby demodulating the character (step 205). The second demodulation unit 24 demodulates the character by using the bar width demodulation table 32.

Note that detailed configurations and operations of the first and second demodulation units 23 and 24 will be fully explained in an embodiment 4.

As discussed above, the bar code demodulating apparatus in the embodiment 2 automatically carries out the first or second demodulating process in accordance with a magnitude of the bar width distortion quantity per bar code. Accordingly, an accuracy of reading the bar codes can be improved.

Further, when the distortion quantity falls within the predetermined range, the distortion quantity of the character to be demodulated is corrected based on the bar width of the already-demodulated character immediately in front of the character to be demodulated.

Embodiment 3

Figure 13:
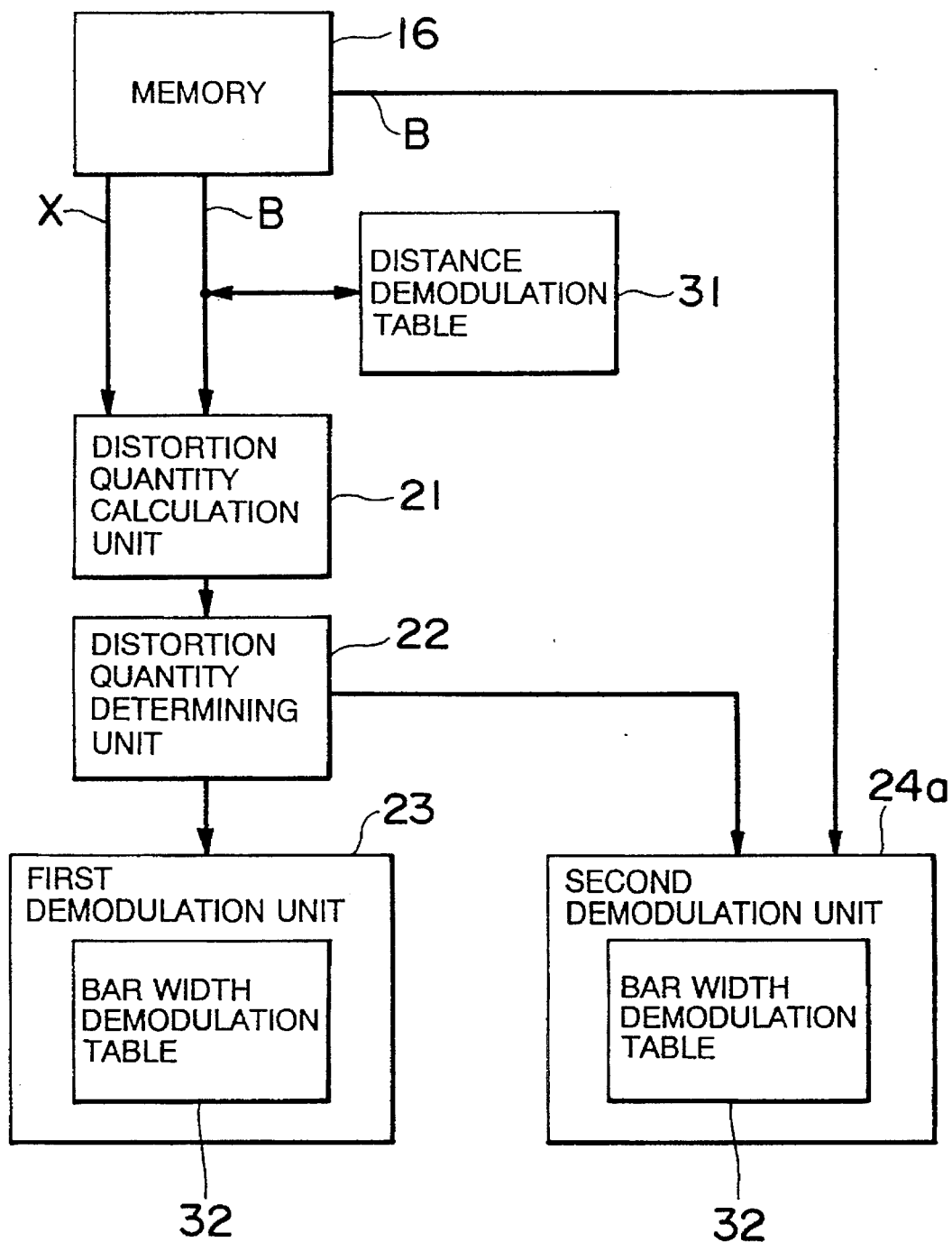
FIG. 13 is a block diagram illustrating a configuration of the character demodulation unit in an embodiment 3 of this invention.

Next, an embodiment 3 of the present invention will be discussed. FIG. 13 is a block diagram illustrating a construction of the character demodulation unit in the embodiment 3 of this invention.

In the embodiment 3, the construction of the second demodulation unit is different from that in the bar code demodulating apparatus in the embodiment 2. If the character is any one of 1, 2, 7 and 8, and when the distortion quantity does not fall within the ranged of the predetermined values, a second demodulation unit 24a inputs the bar width B of the character to be demodulated from the memory 16.

The second demodulation unit 24a demodulates the character by correcting the bar width distortion quantity of the character to be demodulated on the basis of the bar width B of the character to be demodulated.

Note that other configurations are the same as those in the embodiment 2. The same components are marked with the like symbols, and their detailed explanations will be omitted.

Figure 14:
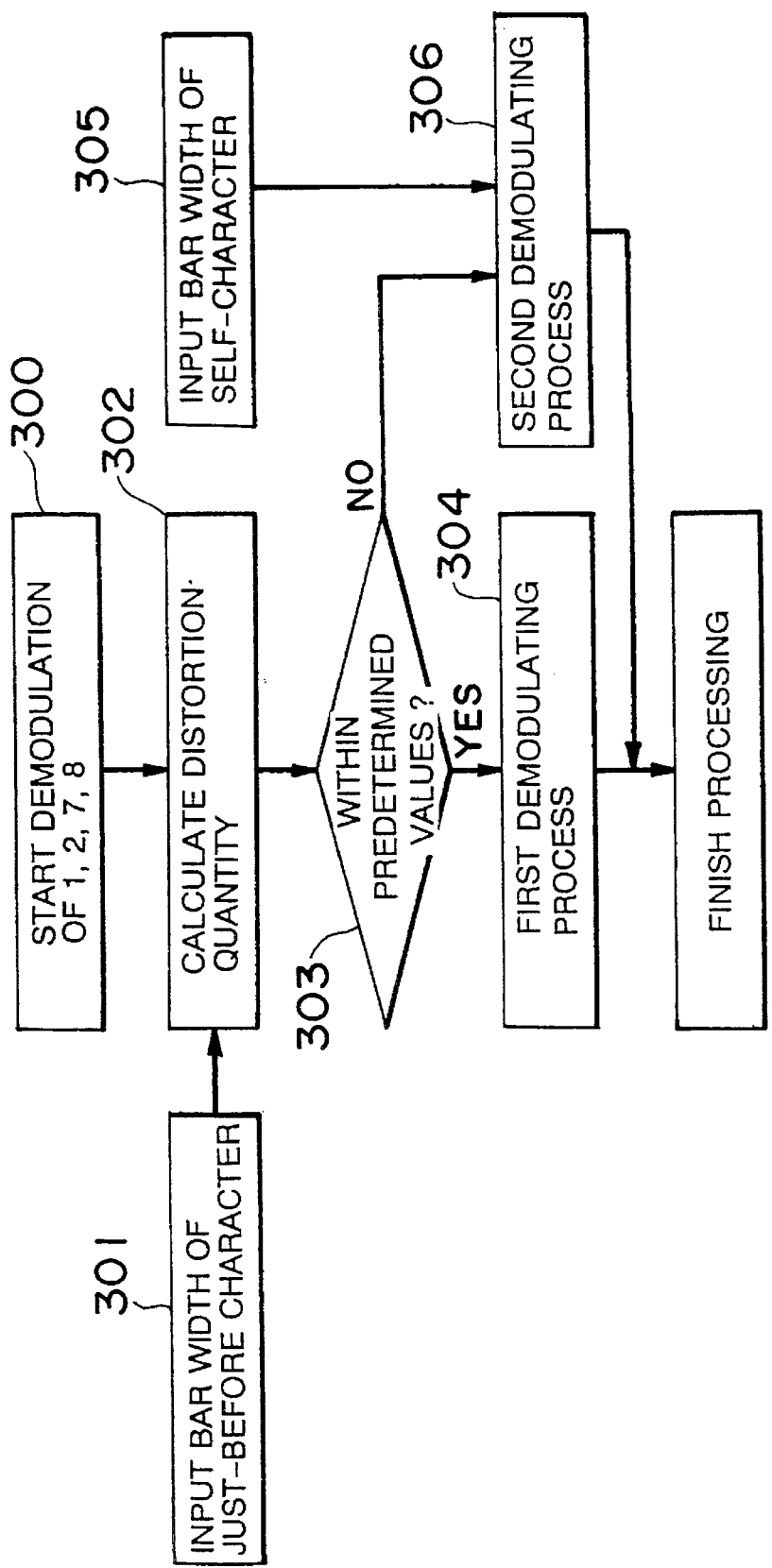
FIG. 14 is a flowchart showing the bar code demodulating method in the embodiment 3 of this invention.

FIG. 14 is a flowchart showing the bar code demodulating method in accordance with the embodiment 3 of this invention. To begin with, if the character is any one of 1, 2, 7 and 8, the bar code demodulating apparatus is incapable of demodulating the character even by using the distance demodulation table 31. For this reason, the demodulation processing of 1, 2, 7 and 8 is started (step 300).

Figure 15:
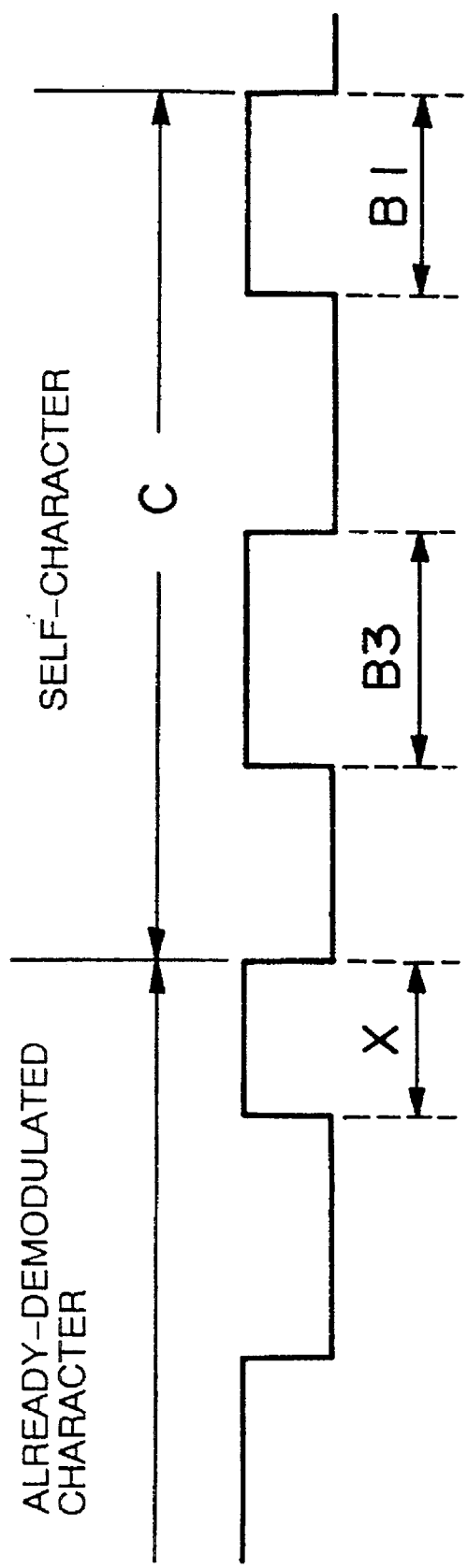
FIG. 15 is a diagram showing a self-character and a character immediately in front of the self-character.

The distortion quantity calculation unit 21 reads, from the memory 16, the bar widths B1 and B2 of the characters (self-characters) to be demodulated as shown in FIG. 15 and the bar widths X of the demodulated characters immediately in front of the characters to be demodulated (step 301).

Then, if the character is any one of 1, 2, 7 and 8, the distortion quantity calculation unit 21 calculates the distortion quantity of the character to be demodulated on the basis of the bar width X of the just-before already-demodulated character (step 302). The distortion quantity determining unit 2 determines whether or not the bar width distortion quantity falls within the previously set range of the predetermined values (step 303).

If the distortion quantity falls within the range of the predetermined values, the first demodulation unit 23 corrects the bar widths B1 and B3 of the characters to be demodulated on the basis of the bar widths X of the just-before already-demodulated characters and thus demodulates the characters (step 304).

Herein, the character is any one 1, 2, 7 and 8, and therefore the bar width demodulation table 32 demodulates the character.

Whereas if the distortion quantity exceeds the range of the predetermined values, the second demodulation unit 24a inputs the bar width of the character to be demodulated from the memory 16 (step 305). Subsequently, the second demodulation unit 24a corrects the bar width distortion quantity of the character to be demodulated on the basis of the bar width of the character to be demodulated and thereby demodulates the character (step 306).

As discussed above, the bar code demodulating apparatus automatically effects the first or second demodulation processing in accordance with a magnitude of the bar width distortion quantity per bar code. Accordingly, the accuracy of reading the bar code can be enhanced.

Further, if the distortion quantity does not fall within the predetermined range, the character can be demodulated while correcting the character by use of the bar width of the self-character.

Embodiment 4

Figure 16:
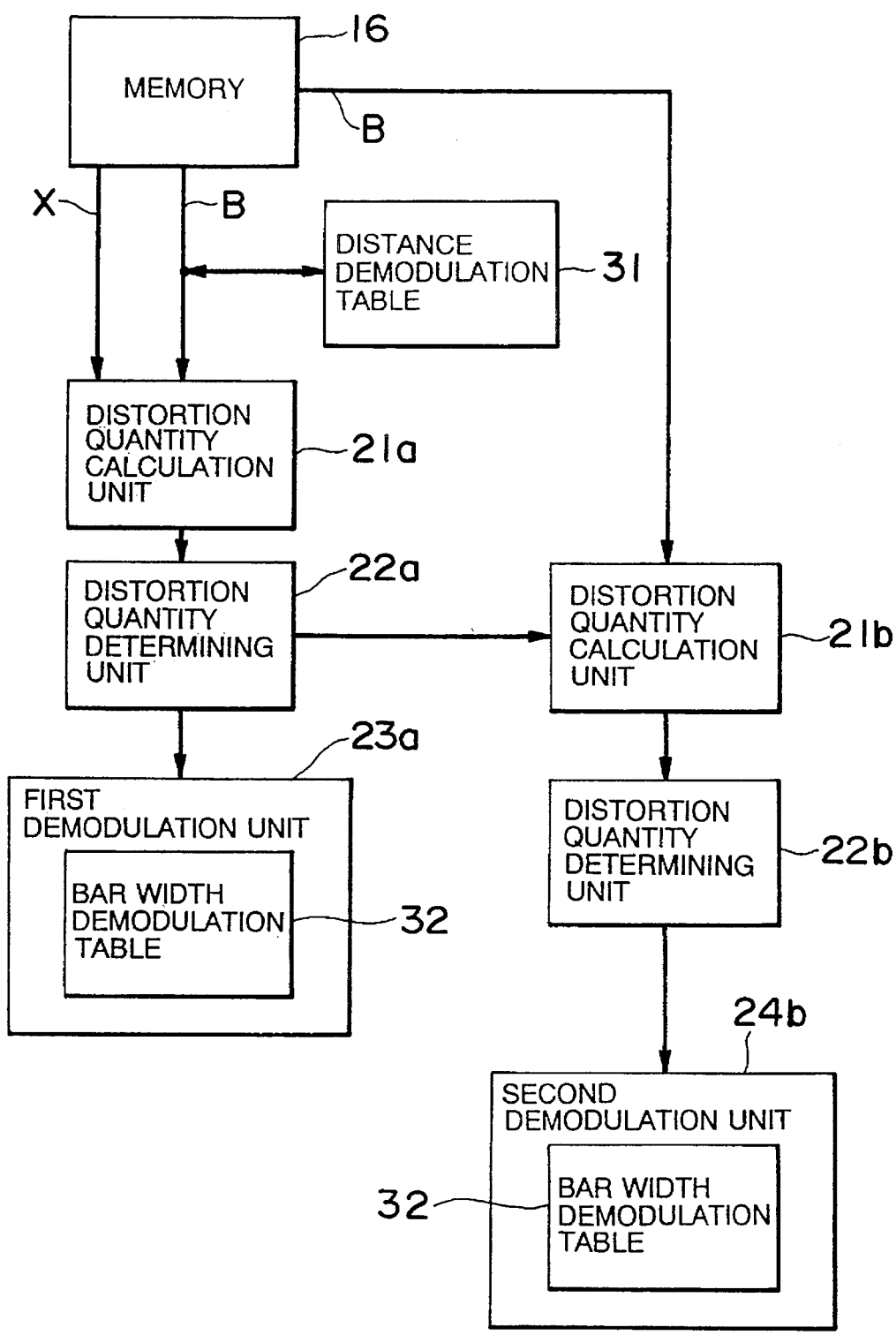
FIG. 16 is a block diagram illustrating a configuration of the character demodulation unit in an embodiment 4 of this invention.

Next, an embodiment of the present invention will be described. FIG. 16 is a block diagram showing a construction of the character demodulation unit in the embodiment 4 of this invention.

Referring to FIG. 16, the character demodulation unit includes the distance demodulation table 31, distortion quantity calculation units 21a and 21b, and distortion quantity determining units 22a and 22b. The character demodulation unit further includes a first demodulation unit 23a and a second demodulation unit 24b.

If the character is any one of 1, 2, 7 and 8, the distortion quantity calculation unit 21a reads, from the memory 16, the bar width B of the character to be demodulated and the bar width X of the already-demodulated character immediately in front of the character to be demodulated.

The distortion quantity calculation unit 21a calculates, as distortion quantities, difference quantities B1-X and B3-X between the bar width X of the already-demodulated character immediately in front thereof and the bar widths B1 and B3 of the characters to be demodulated.

The distortion quantity calculation unit 21a calculates a module value by dividing the difference quantity therebetween by one-module bar width. The distortion quantity determining unit 22a is connected to the distortion quantity calculation unit 21a.

The distortion quantity determining unit 22a determines whether or not the module value is within values larger and smaller by 0.4 than a predetermined fiducial module value. The first demodulation unit 23 a is connected to the distortion quantity determining unit 22a.

If the module value is within the values larger and smaller by 0.4 than the predetermined fiducial module value, the first demodulation unit 23a demodulates the character. The first demodulation unit 23a and the second demodulation unit 24a have the bar width demodulation tables 32.

The distortion quantity calculation unit 21b is connected to the distortion quantity determining unit 22a. If the module value is not within the values larger and smaller by 0.4 than the predetermined fiducial module value, the distortion quantity calculation unit 21b inputs the bar width of the character to be demodulated from the memory 16. The distortion quantity calculation unit 21b calculates what number of modules the bar width of the character to be demodulated has with respect to one module value.

The distortion quantity determining unit 22b is connected to the distortion quantity calculation unit 21b. The distortion quantity determining unit 22b determines whether or not the module value is within the values larger and smaller than by 0.4 of the fiducial module value. The second demodulation unit 24b is connected to the distortion quantity determining unit 22b.

The second demodulation unit 24b, if the module value is within the values larger and smaller than by 0.4 than the fiducial module value, demodulates the character.

Figure 17:
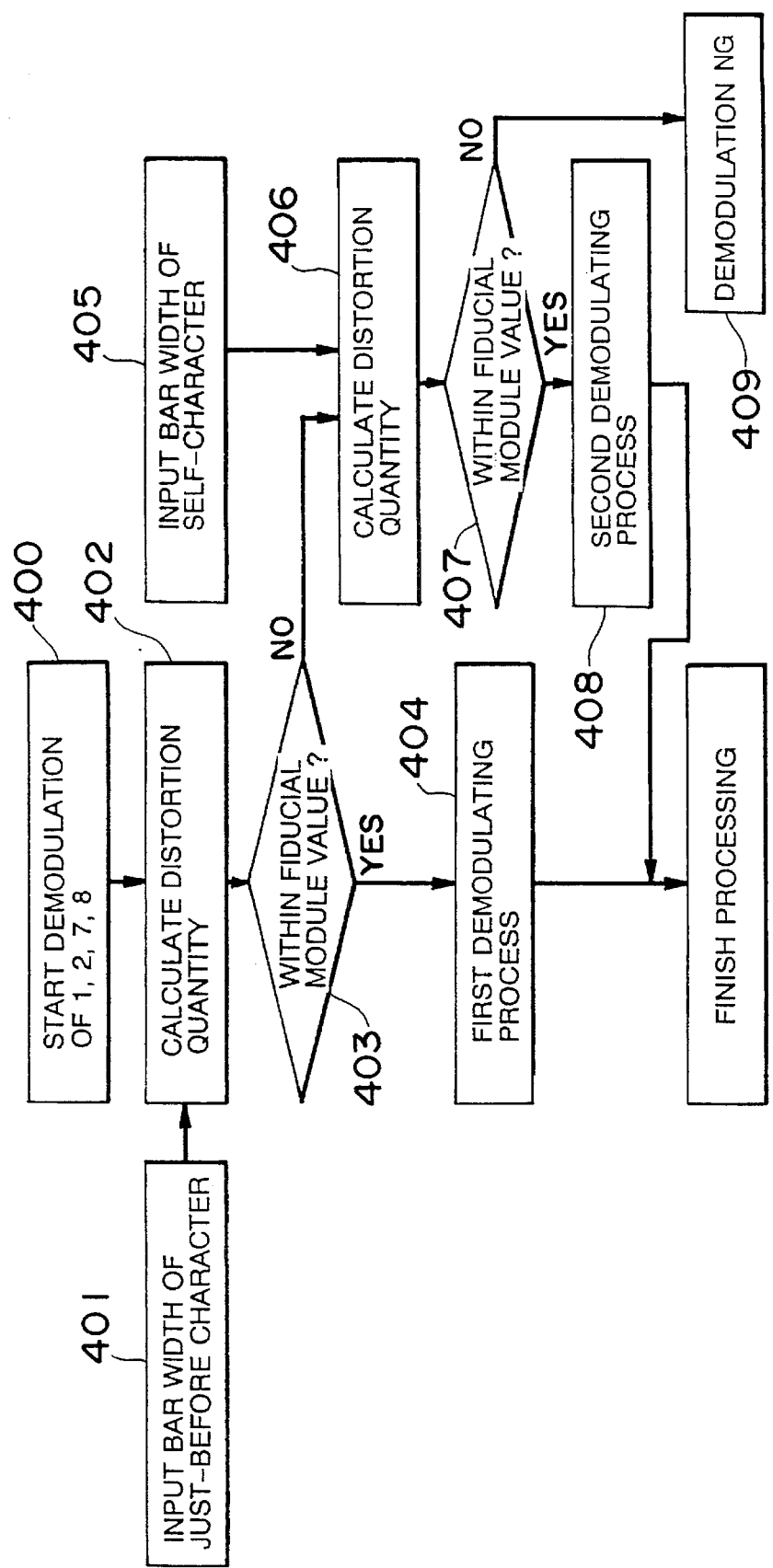
FIG. 17 is a flowchart showing the bar code demodulating method in the embodiment 4 of this invention.

FIG. 17 is a flowchart showing the bar code demodulating method in accordance with the embodiment 3 of this invention. First, if the character is any one of 1, 2 7 and 8, the bar code demodulation is incapable of demodulating the character by use of the distance demodulation table 31. For this reason, the demodulation process of 1, 2, 7 and 8 is started (step 400).

The distortion quantity calculation unit 21a reads, from the memory 16, the bar widths B of the characters of 1, 2, 7 and 8 to be demodulated and the bar widths X of the demodulated characters immediately in front of the characters to be demodulated (step 401).

If the character to be demodulated is any one of 1, 2, 7 and 8, the distortion quantity calculation unit 21a calculates, as distortion quantities, difference quantities B1-X and B3-X between the bar width X of the just-before already-demodulated character and the bar widths B1 and B3 of the characters to be demodulated (step 402).

Further, the distortion quantity calculation unit 21a calculates a module value by dividing the difference quantity therebetween by one-module bar width. Herein, one-module value is a value obtained by dividing a length of one character by 7. It is because one character consists of 7 modules.

Figure 18:
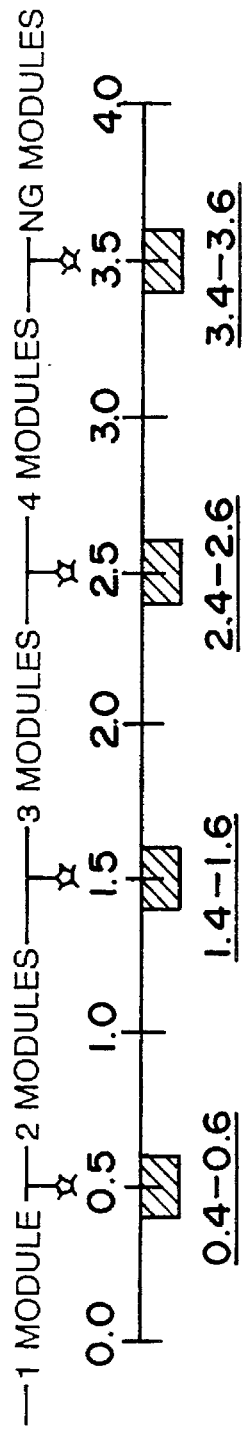
FIG. 18 is a diagram of assistance in explaining the processing by a first demodulation unit in the embodiment 4.

Then, the calculated module values become, as shown in FIG. 18, values from, e.g., 0.0 to 3.5. The distortion quantity determining unit 22a determines whether or not the module value is within the values larger and smaller by 0.4 than the predetermined fiducial module value (step 403). The fiducial module values are, as shown in FIG. 18, e.g., 0.0, 1.0, 2.0. and so on.

The first demodulation unit 23a, if the module value is within the values larger and smaller by 0.4 than the predetermined fiducial module value, demodulates the character (step 404). That is, if the module value is within the value larger and smaller by 0.4 than the fiducial module value, the modulate value is corrected to the fiducial module value.

The fiducial module value is added to the module value of the bar width of the already-demodulated character. In this way, if the distortion quantity falls within the predetermined range, a dimension of the bar width of the character to be demodulated is obtained based on a dimension of the bar width of the just-before demodulated character. Then, the character is demodulated based on the bar width of the character to be demodulated by use of the bar width demodulation table 32.

On the other hand, the module value is not within the values larger and smaller by 0.4 than the predetermined fiducial module value as the case may be. The module value falls within a range of values larger and smaller by 0.1 than a module value 1.5 in some cases. In this instance, it is impossible to know whether the module value belongs to the fiducial module value 1.0 or 2.0.

Figure 19:
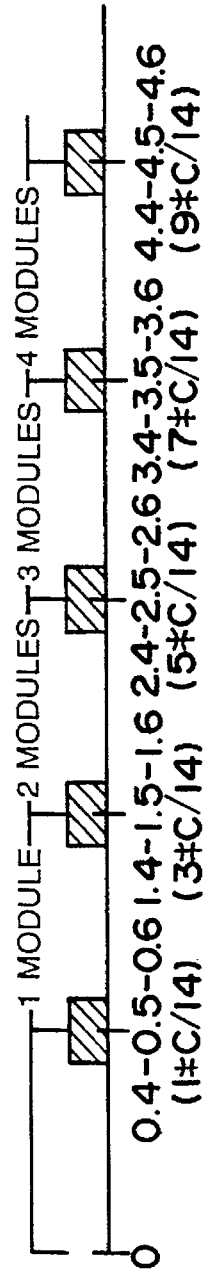
FIG. 19 is a diagram of assistance in explaining the processing by a second demodulation unit in the embodiment 4.

For this reason, the distortion quantity calculation unit 21b inputs the bar widths B1, B3 of the to-be demodulated characters from the memory 16. The distortion quantity calculation unit 21b then calculates what number of modules the bar width of the character to be demodulated has with respect to one module value (step 406). The module value of the bar width of the character to be demodulated, as shown in FIG. 19, ranges from, e.g., 0.0 to 4.0.

Then, the distortion quantity determining unit 22b determines whether or not the module value thereof is within the values larger and smaller by 0.4 than the fiducial module value (step 407). The above-mentioned fiducial module values are, e.g., 1.0, 2.0 and so on.

The second demodulation unit 24b, if the module value is within the values larger and smaller by 0.4 than the fiducial module value, considers this module value as the fiducial module value and therefore demodulates the character (step 408). That is, the bar width is calculated based on the bar width of the character to be demodulated. Subsequently, the bar width demodulation table 32 demodulates the character on the basis of the bar width of the character to be demodulated.

On the other hand, the second demodulation unit 24b, if the module value thereof is not within the values larger and smaller by 0.4 than the fiducial module value, does not demodulate the character (step 409).

As discussed above, in accordance with the embodiment 4 also, the first or second demodulation processing is automatically carried out in accordance with a magnitude of the distortion quantity of the bar width per bar code. Accordingly, the accuracy of reading the bar codes can be improved.

FIG. 20 illustrates a result of demodulating the character in the embodiment 4. Turning to FIG. 20C, the bar width X of the just-before character is 1.0. The bar width B of the character to be demodulated includes values from 0.5 to 1.5.

In this case, even if the bar width B has any value from 0.7 through 1.3, the first demodulation unit 23b can demodulate that character. In FIG. 20, the demodulation range thereof is indicated by "correction OK". Even when the bar width B may be any value of 0.5, 0.6, 1.4 and 1.5, the second demodulation unit 24b is capable of demodulating the character.

Referring gain to FIG. 20, the demodulation range thereof is indicated by "correction gray zone & direction demodulation". Herein, the direction demodulation implies that the bar width is demodulated based on the self-character to be demodulated.

Note that FIGS. 20A, 20B, 20D and 20E are diagrams each showing the demodulation of the character when the bar width X of the just-before character varies. Take a case shown in FIG. 20B for example, the bar width X of the just-before character is 1.3. The bar widths B of the characters to be demodulated are values ranging from 0.5 to 1.5.

In an example shown in FIG. 20C, the basis is module 1.0 of the B-bar. In an example shown in FIG. 20B, the basis is module 1.3 of the B-bar, and, therefore, even when the B-bar module takes any value from 1.0 to 1.5, the first demodulation unit 23a is capable of demodulating that character. Even when the B-bar module takes any value from 0.6 through 0.9, the second demodulation unit 24b can demodulate that character.

Further, in an instance shown in FIG. 20D, the basis is module 0.7 of the B-bar, and, hence, even when the B-bar module takes any value from 0.5 to 1.0, the first demodulation unit 23a can demodulate that character. Even if the B-bar module takes any value from 1.1 to 1.4, the second demodulation unit 24b is capable of demodulating that character.

The first demodulation processing and the second demodulation processing are conducted in this manner, and, therefore, it can be understood from FIGS. 20A through 20E that the accuracy of reading the bar codes is enhanced.

Embodiment 5

Figure 21:
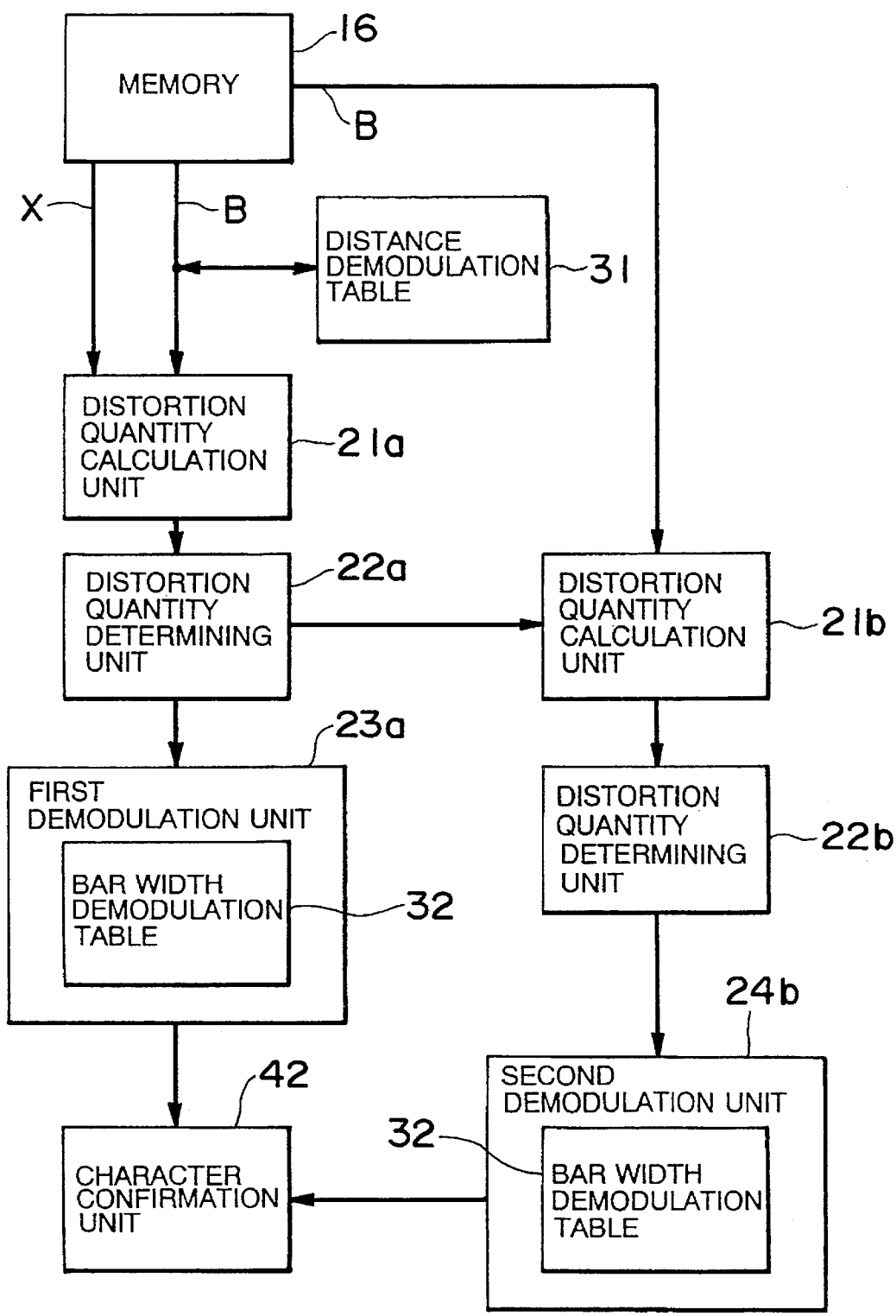
FIG. 21 is a block diagram illustrating a configuration of the character demodulation unit in an embodiment 5 of this invention.

Next, an embodiment b 5of the present invention will be explained. FIG. 21 is a block diagram illustrating a configuration of the character demodulation unit in the embodiment 5 of this invention. In accordance with the embodiment 5, a character confirmation unit 42 is further added to the construction of the embodiment 4. The character confirmation unit 42 is connected to the first demodulation unit 23a and the second demodulation unit 24b.

If the bar codes are considerably bad in quality, it may happen that the characters 1, 2, 7 and 8 are mistakenly demodulated. For this reason, if the demodulated characters are 1, 2, 7 and 8, and when the subsequent character is one exclusive of 1, 2, 7 and 8, it is required that the just-before demodulated characters 1, 2, 7 and 8 be reconfirmed by use of the black bar widths of the characters exclusive of the correctly-demodulated characters 1, 2, 7 and 8.

The first demodulation unit 23a or the second demodulation unit 24b demodulates the characters and, at the same time, determines whether or not the just-before characters are 1, 2, 7 and 8.

The character confirmation unit 42, when the first demodulation unit 23a or the second demodulation unit 24b demodulates the character immediately in front of the to-be-demodulated character exhibiting no distortion, reconfirms the just-before demodulated character by using the black bar of the to-be-demodulated character with no distortion.

Herein, the characters exhibiting no distortion are those exclusive of 1, 2, 7 and 8. The just-before characters are the characters 1, 2, 7 and 8.

Figure 22:
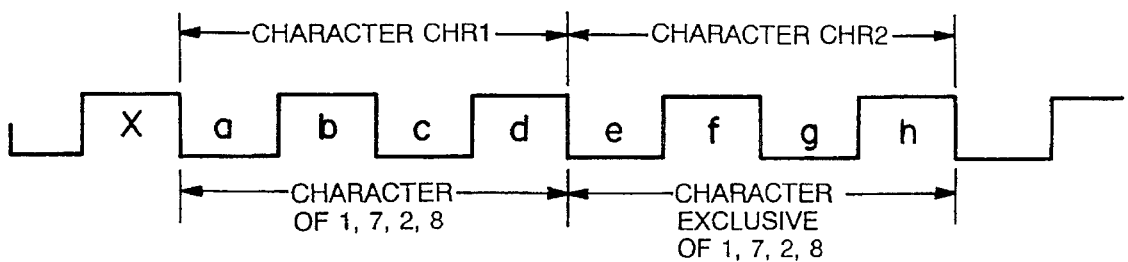
FIG. 22 is a diagram of assistance in explaining a reconfirmation of the character in the embodiment 5.
Figure 23:
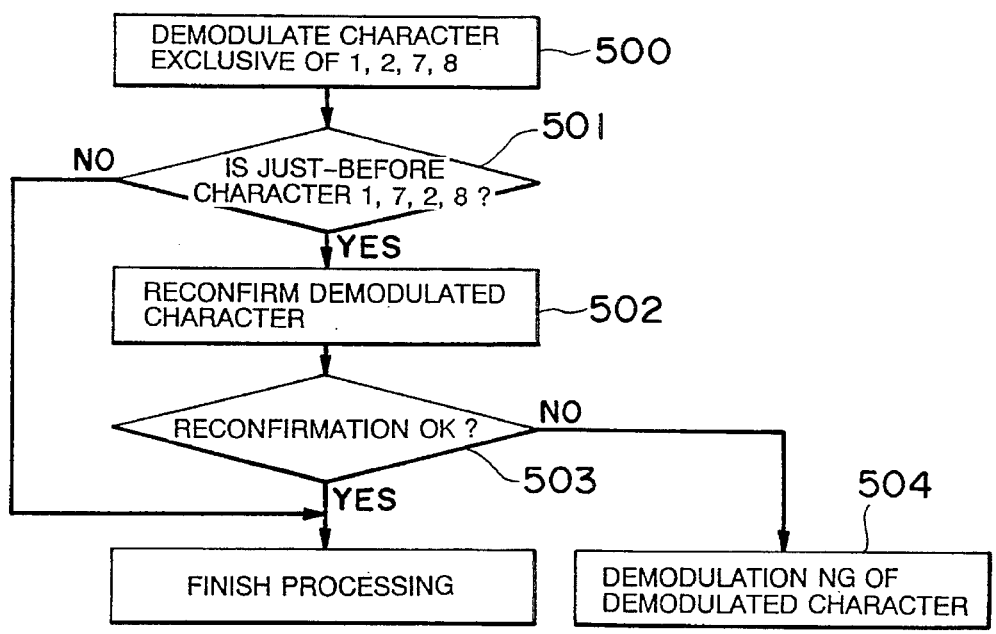
FIG. 23 is a flowchart showing the bar code demodulating method in the embodiment 5.

Next, the bar code demodulating method in the embodiment 5 will be explained. FIG. 22 is a diagram of assistance in explaining the reconfirmation of the character. FIG. 23 is a flowchart showing the bar code demodulating method in the embodiment 5. Note that the processing in the embodiment 5 will be conducted after finishing the first demodulation processing in step 404 shown in the embodiment 4 or the second demodulation processing in step 408.

First, as shown in FIG. 22, a character CHR1 is any one of 1, 2, 7 and 8. The first demodulation unit 23a demodulates the character CHR1 by employing the black bar X of the demodulated character immediately in front of the character CHR1 to be demodulated.

Next, a character CHR2 other than 1, 2, 7 and 8 is demodulated by the distance demodulation table 31 (step 500). This character CHR2 other than 1, 2, 7 and 8 is correctly demodulated. Then, the first demodulation unit 23a determines whether or not the character immediately in front of the character CHR2 is any one of 1, 2, 7 and 8 (step 501).

If the character immediately in front of the character CHR2 is any one of 1, 2, 7 and 8, the character confirmation unit 42 confirms dimensions of the bar widths of black bars b and d of the character CHR1 by use of accurate black bars f and h of the character CHR2.

Subsequently, the character confirmation unit 42 obtains a numeral of the character CHR1 and determines whether or not this numeral coincides with the numeral demodulated by the first demodulation unit 23a or the second demodulation unit 24b.

That is, the character confirmation unit 42 reconfirms whether or not the demodulation processing of the just-before character CHR1 is correctly performed by the first demodulation unit 23a or the second demodulation unit 24b (step 502).

Then, the character confirmation unit 42 determines whether the reconfirmation of the just-before character CHR1 is OK or NG (step 503). If the reconfirmation of the just-before character is OK, the processing comes to an end. Whereas if the reconfirmation of the just-before character is NG, the character confirmation unit 42 decides that the just-before character CHR1 can not be demodulated (step 504). Accordingly, a reliability of the characters CHR1 1, 2, 7 and 8 is improved.

Note that the character is reconfirmed by employing the first demodulation unit 23a in the embodiment 5. The character may also be reconfirmed by use of. e.g., the second demodulation unit 24b.

Embodiment 6

Figure 24:
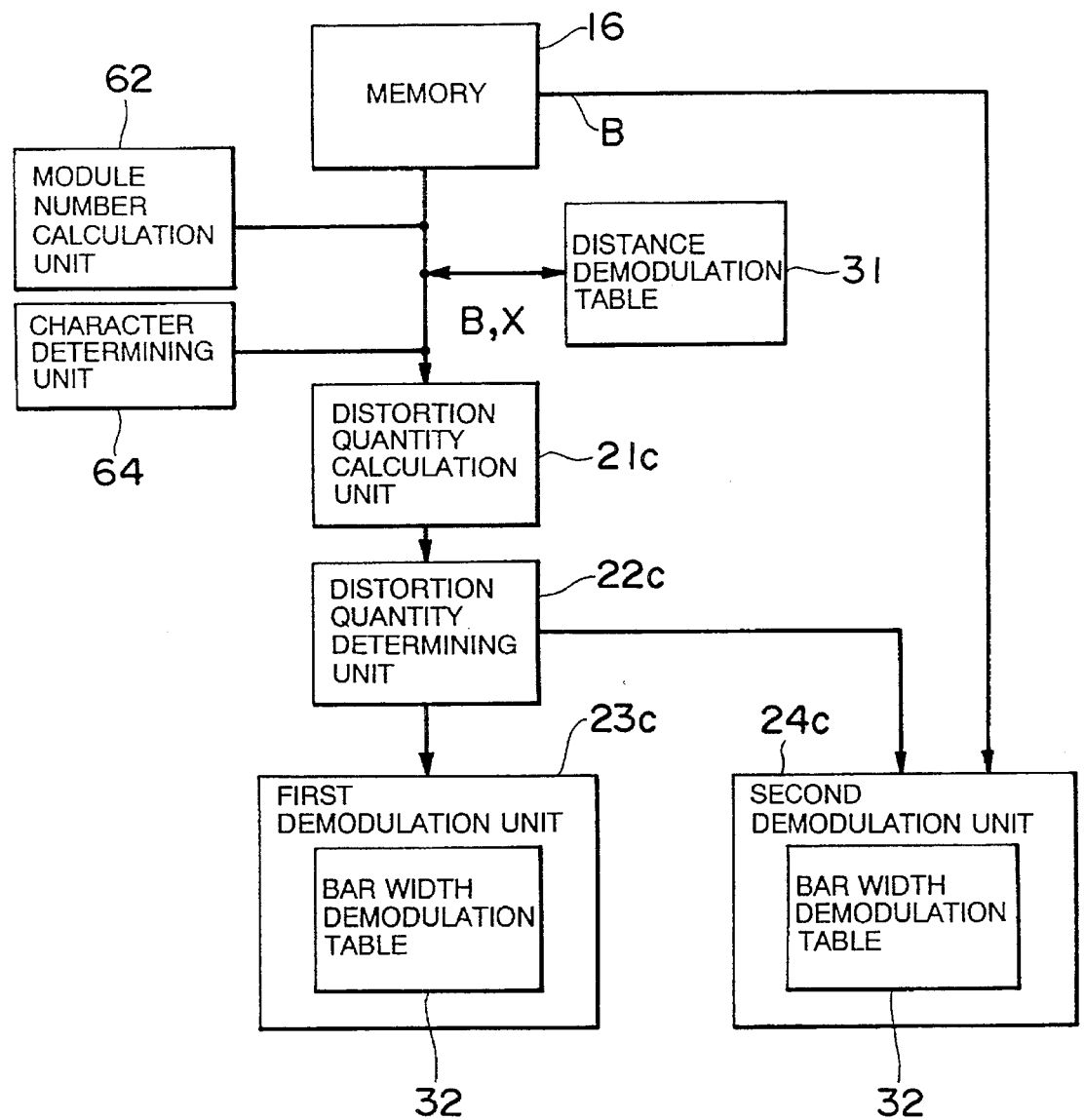
FIG. 24 is a block diagram illustrating a configuration of the character demodulation unit in an embodiment 6 of this invention.

Next, an embodiment 6 of this invention will be discussed. FIG. 24 is a block diagram illustrating a construction of the character demodulation unit in the embodiment 6. The character demodulation unit includes the memory 16, the distance demodulation table 31, a module number calculation unit 62 and a character determining unit 64. Connected to the memory 16 are the distance demodulation table 31, the module number calculation unit 62 and the character determining unit 64.

The module number calculation unit 62 reads count values of the delta distances T1 and T2 of the character from the memory 16 and calculates the number of modules of the delta distances T1 and T2.

The distance demodulation table 31 calculates (demodulates) a character exclusive of 1, 2, 7 and 8 from the thus calculated number of modules of the delta distances T1 and T2. The character determining unit 64 determines whether or not the character to be demodulated is one of 1, 2, 7 and 8.

The character demodulation unit further comprises a distortion quantity calculation unit 21c, a distortion quantity determining unit 22c, a first demodulation unit 23c and a second demodulation unit 24c. The distortion quantity calculation unit 21c is connected to the character determining unit 64 as well as to the memory 16.

The distortion quantity calculation unit 21c, if the character is one of 1, 2, 7 and 8, calculates a distortion quantity of the bar width of the character to be demodulated and, at the same time, calculates a distortion quantity of the bar width of the demodulated character immediately in front of the character to be demodulated. The distortion quantity determining unit 22c is connected to the distortion quantity calculation unit 21c.

The distortion quantity determining unit 22c determines a positive/negative sign of the distortion quantity, calculated by the distortion quantity calculation unit 21c, of the bar width of the character to be demodulated and the distortion quantity, calculated by the same, of the bar width of the just-before demodulated character. The first demodulation unit 23c and the second demodulation unit 24c are connected to the distortion quantity determining unit 22c.

If a sign of the distortion quantity of the bar width of the character to be demodulated is identical with a sign of the distortion quantity of the bar width of the just-before demodulated character, the first demodulation unit 23c corrects the distortion quantity of the bar width of the character to be demodulated on the basis of the bar width of the just-before demodulated character. The first demodulation unit 23c demodulates the above character with the aid of the bar width demodulation table 32.

Whereas if the sign of the distortion quantity of the bar width of the character to be demodulated is different from the sign of the distortion quantity of the bar width of the just-before demodulated character, the second demodulation unit 24c corrects the distortion quantity of the bar width thereof on the basis of the bar width of the character to be demodulated which comes from the memory 16. The second demodulation unit 24c demodulates the character with the aid of the bar width demodulation table 32.

Figure 25:
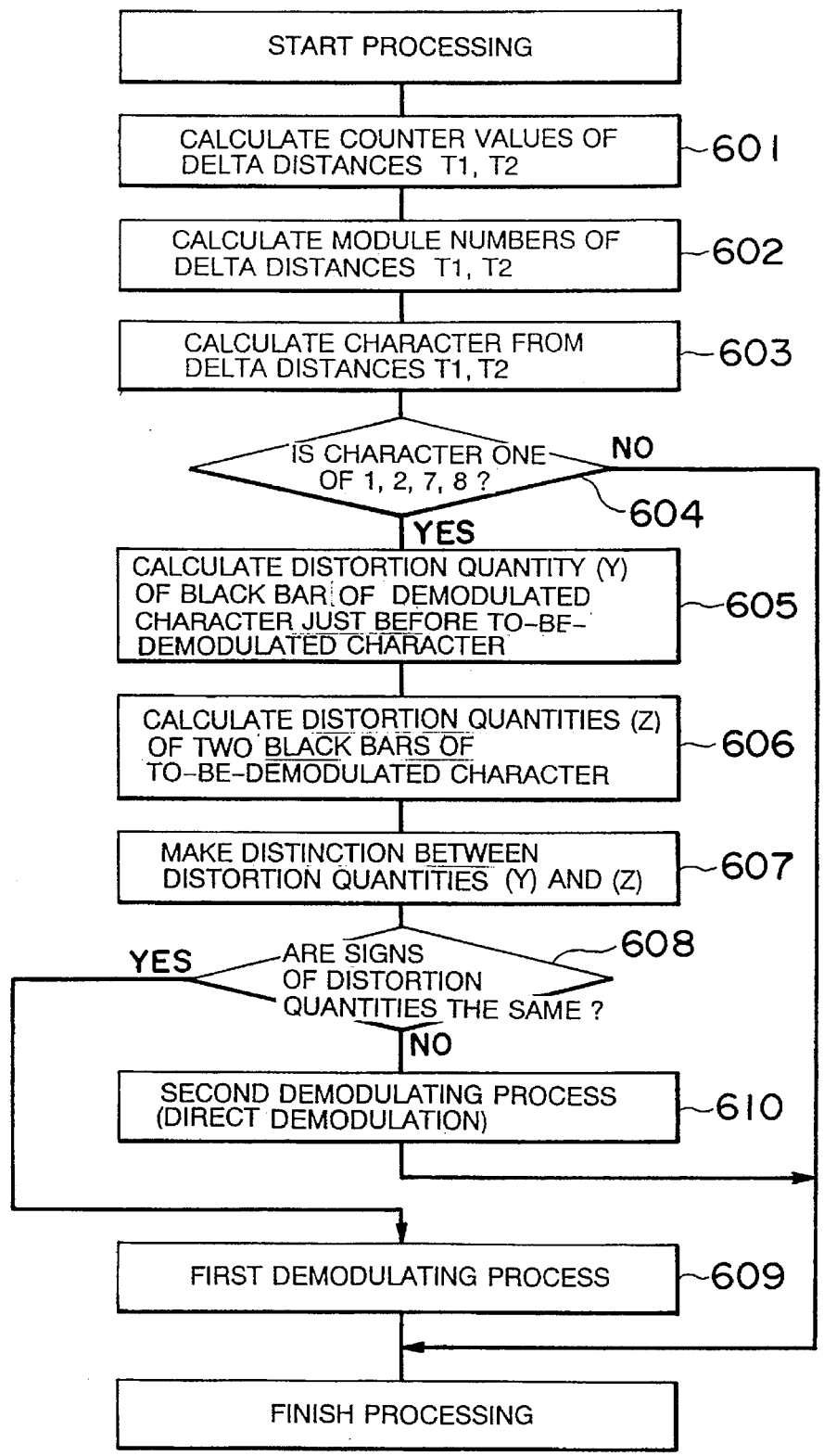
FIG. 25 is a flowchart showing the bar code demodulating method in the embodiment 6.

Next, the bar code demodulating method in the embodiment 6 will be explained with reference to a flowchart shown in FIG. 25. To begin with, the memory 16 stores the count values of the bar widths, and, hence, the counter values of the delta distances T1 and T2 are read from the memory 16 to the module number calculation unit 62 (step 601).

Next, the module number calculation unit 62 calculates the number of modules of the delta distances T1 and T2 (step 602). Then, the distance demodulation table 31 serves to calculate the character on the basis of the delta distances T1 and T2 (step 603). The character determining unit 64 determines whether the calculated character is an odd or even numeral among 1, 2, 7 and 8 (step 604).

If the calculated character is the odd or even numeral among 1, 2, 7 and 8, the distortion quantity calculation unit 21c calculates a distortion quantity (Y) of the black bar of the demodulated character immediately in front of the character to be demodulated (step 605). Next, the distortion quantity calculation unit 21c calculates distortion quantities (Z) of two black bars of the character to be demodulated (step 606).

Further, the distortion quantity determining unit 22c makes a distinction between the distortion quantity (Y) and the distortion quantities (Z) (step 607). Subsequently, the distortion quantity determining unit 22c determines whether or not a positive/negative sign of the distortion quantity (Y) is identical with a sign of the distortion quantities (Z) (step 608).

It is herein assumed that the positive/negative sign of the distortion quantity (Y) is identical with the sign of the distortion quantities (Z). For example, both of the signs of the distortion quantity (Y) and the distortion quantities (Z) are positive (+); or alternatively, both of the signs of the distortion quantity (Y) and the distortion quantities (Z) are negative (−).

If the distortion quantity (Y) and the distortion quantities (Z) have the same positive or negative sign, generally, a difference between the distortion quantity (Y) and each of the distortion quantities (Z) becomes small. In this case, the first demodulation unit 23c demodulates the character (step 609).

Whereas if the distortion quantity (Y) and the distortion quantities (Z) have positive/negative signs different from each other, generally, the difference between the distortion quantity (Y) and each of the distortion quantities (Z)

becomes large. In this instance, the second demodulation unit 24c demodulates the character (step 610).

As discussed above, the first or second demodulation processing is automatically effected corresponding to whether the distortion quantities of the bar widths of the character to be demodulated and of the just-before demodulated character have the same positive/negative signs or different signs. Accordingly, the accuracy of reading the bar codes can be improved.

Figures 26A, 26B:
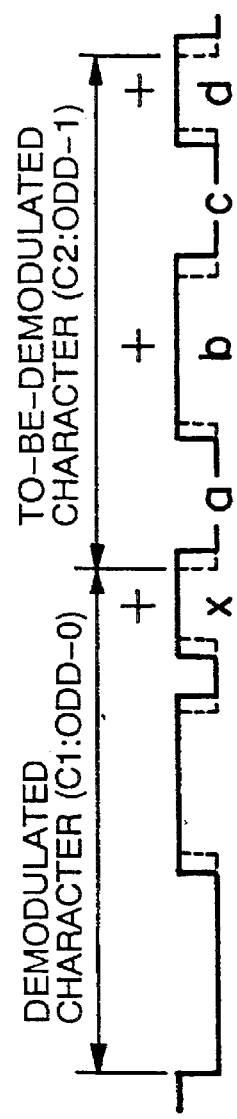
FIG. 26A is a diagram showing an example where the character is thickened in black on the whole.
FIG. 26B is a diagram showing the number of modules of each logic width of white and black bars of a demodulated character and a to-be-demodulated character.

Given next is a specific example of the embodiment 6. FIG. 26 is a diagram showing an example where the character becomes thick in black on the whole. FIG. 26A shows a demodulated character (character length C1) and a character (character length C2) to be demodulated. A bar width indicated by a dotted line is a logic width (fiducial width), while a bar width indicated by a solid line is an actual bar width containing the distortion quantity.

As can be understood from FIG. 26A, a black bar x, a black bar b and a black bar d are all thick and positive (+) with respect to the logic width. FIG. 26B illustrates the number of modules of the logic widths of the white and black bars of the demodulated character and of the character to be demodulated.

Figure 27A:
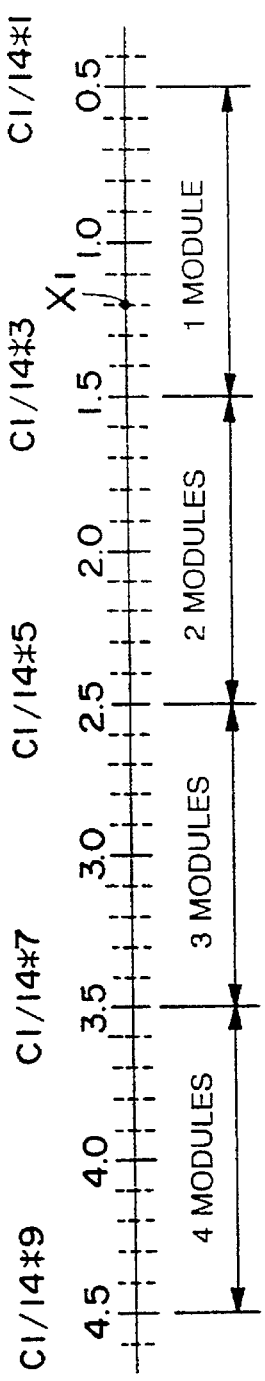
FIG. 27A is a diagram showing the number of modules of a bar width x of the demodulated character shown in FIG. 26A.
Figure 27B:
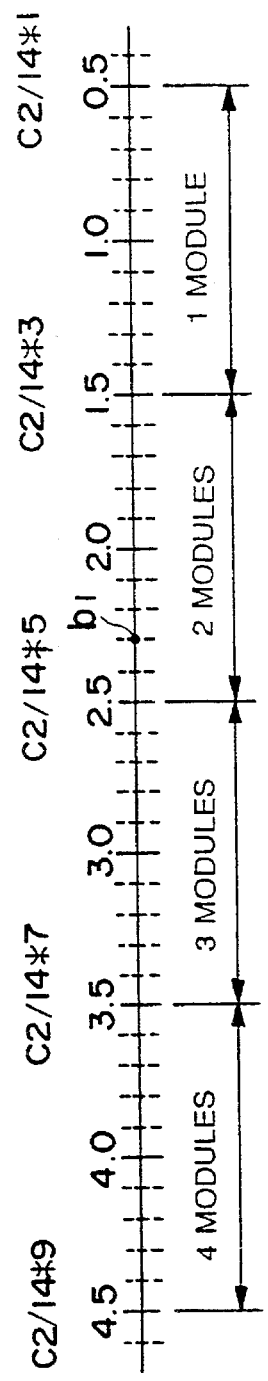
FIG. 27B is a diagram showing the number of modules of a bar width b of the to-be-demodulated character shown in FIG. 26A.

FIG. 27 shows the number of modules of the respective actual bars of the characters shown in FIG. 26. Herein, one module is a value obtained by dividing the character length C1 or C2 by 7. Referring to FIG. 27A, the number modules x1 of the x-bar is 1.2. Turning to FIG. 27B, the number of modules b1 of the b-bar is 2.3.

Figure 27C:
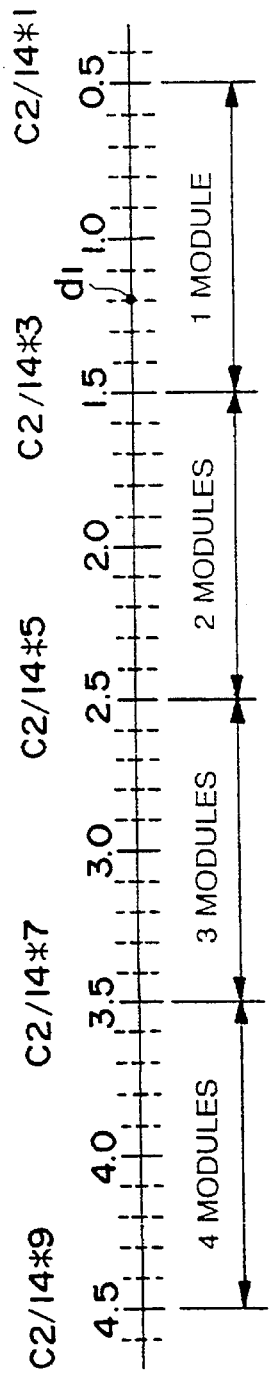
FIG. 27C is a diagram showing the number of modules of a bar width d of the to-be-demodulated character shown in FIG. 26A.
Figures 28A, 28B:
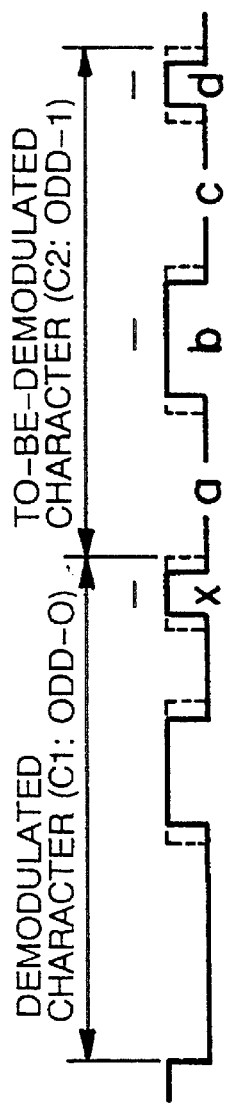
FIG. 28A is a diagram showing an example where the character is thinned in black on the whole.
FIG. 28B is a diagram showing the number of modules of each logic width of the white and black bars of the demodulated character and the to-be-demodulated character.
Figure 29A:
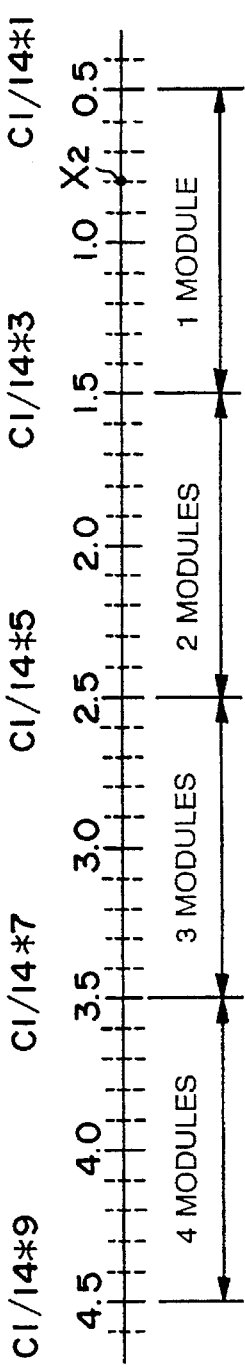
FIG. 29A is a diagram showing the number of modules of the bar width x of the demodulated character shown in FIG. 28A.
Figure 29B:
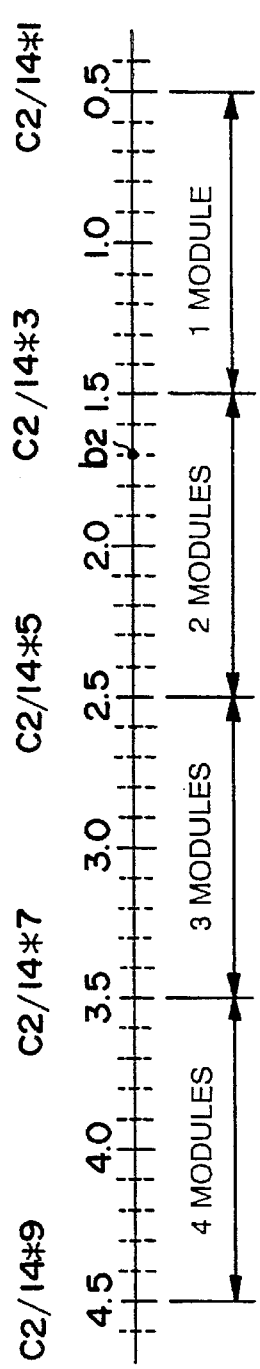
FIG. 29B is a diagram showing the number of modules of the bar width b of the to-be-demodulated character shown in FIG. 28A.
Figure 29C:
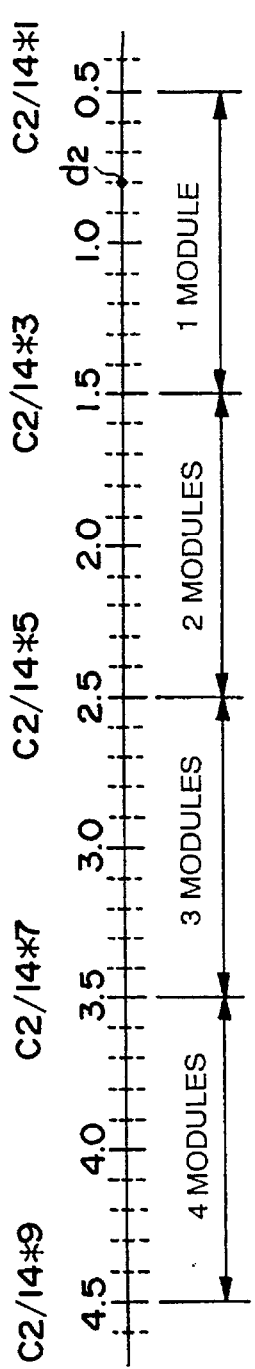
FIG. 29C is a diagram showing the number of modules of the bar width d of the to-be-demodulated character shown in FIG. 28A.

Referring to FIG. 27C, the number of modules d1 of the d-bar is 1.2. The number of modules of the respective bars are all positive with respect to the fiducial modules. Hence, in this case also, the first demodulation unit 23c performs the demodulation processing.

Figures 30A, 30B:
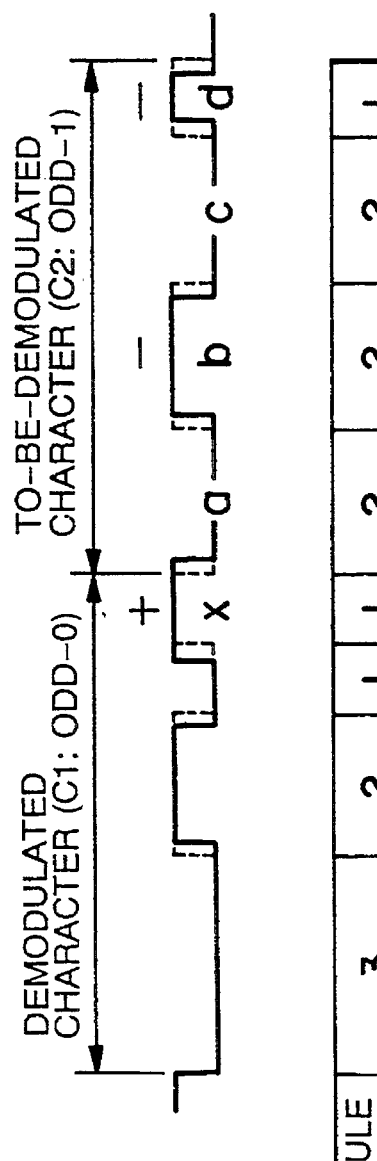
FIG. 30A is a diagram illustrating an example where a basic bar X is extremely thickened in black.
FIG. 30B is a diagram showing the number of modules of each logic width of the white an black bars of the demodulated character and the to-be-demodulated character.

Next, FIG. 30 is a diagram showing an example where the basic x-bar becomes extremely thick in black. As can be known from FIG. 30A, the black x-bar is thick, and both of the black b- and d-bars are thin. That is, the black x-bar is positive (+) with respect to the logic width. Both of the black b- and d-bars are negative (−) with respect to the logic width.

Figure 31A:
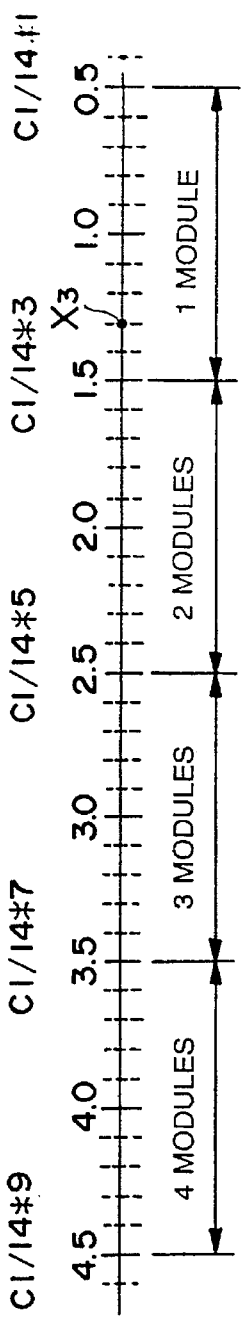
FIG. 31A is a diagram showing the number of modules of the bar width x of the demodulated character shown in FIG. 30A.
Figure 31B:
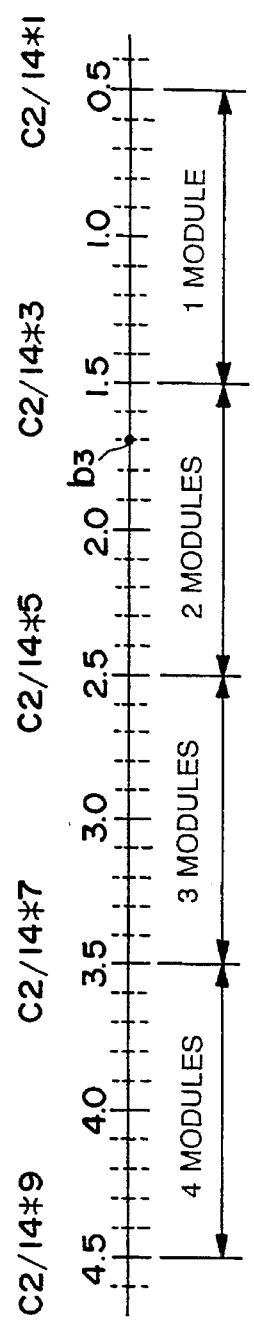
FIG. 31B is a diagram showing the number of modules of the bar width b of the to-be-demodulated character shown in FIG. 30A.
Figure 31C:
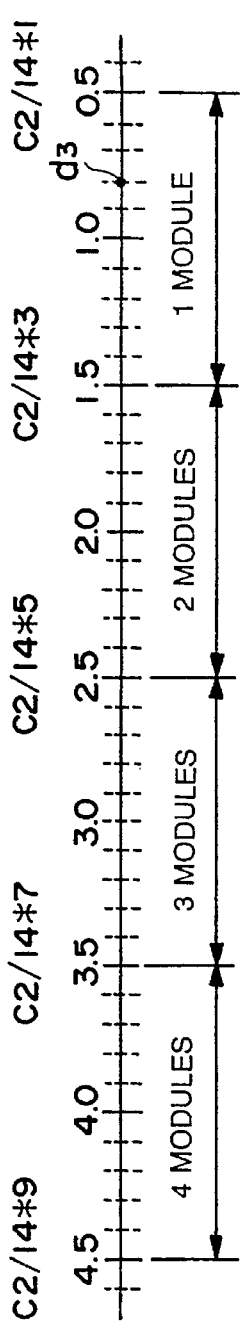
FIG. 31C is a diagram showing the number of modules of the bar width d of the to-be-demodulated character shown in FIG. 30A.

Further, referring to FIG. 31A, the number of modules x3 of the x-bar is 1.3. Turning to FIG. 31B, the number of modules b3 of the b-bar is 1.7. Referring to FIG. 31C, the number of modules d3 of the d-bar is 0.8. Hence, in this case, the positive/negative signs of the black x- and b-bars are different from each other, and, therefore, the second demodulation unit 24c carries out the demodulation processing.

Embodiment 7

Figure 32:
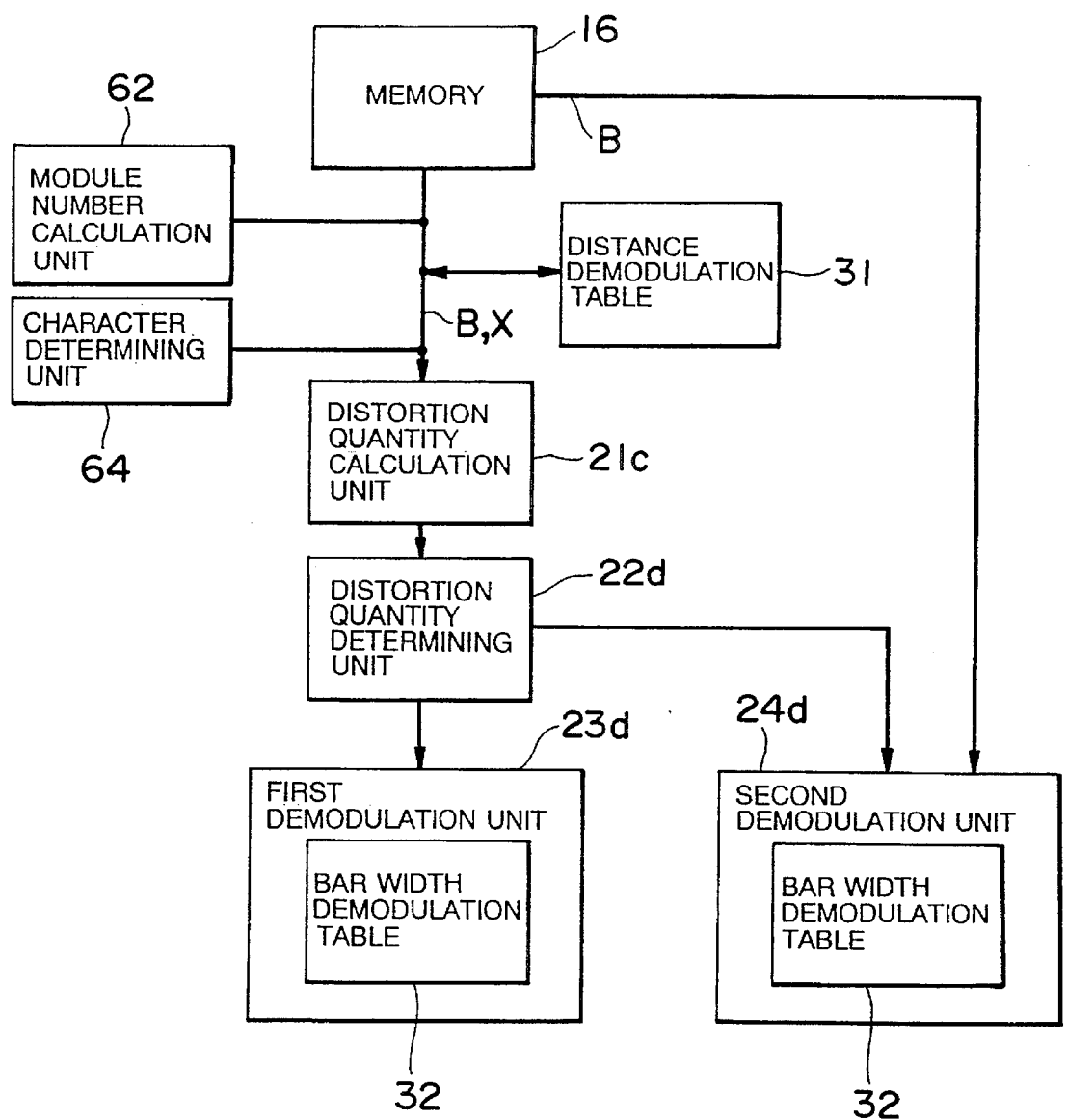
FIG. 32 is a block diagram illustrating a configuration of the character demodulation unit in an embodiment 7.

Next, an embodiment 7 of this invention will be discussed. FIG. 32 is a block diagram illustrating a construction of the character demodulation unit in the embodiment 7. The character demodulation unit includes the distortion quantity calculation unit 21c, a distortion quantity determining unit 22d, a first demodulation unit 23d and a second demodulation unit 24d.

The distortion quantity calculation unit 21c calculates the distortion quantity of the bar width of the character to be demodulated and, at the same time, calculates the distortion of the bar width of the demodulated character immediately in front of the character to be demodulated.

The distortion quantity determining unit 22d determines whether or not a difference between the distortion quantity, calculated by the distortion quantity calculation unit 21c, of the bar width of the to be demodulated character and the distortion quantity, calculated by the same unit, of the bar width of the just-before demodulated character falls within a range of predetermined values.

If the difference between the distortion quantities of the bar widths falls within the range of the predetermined values, the first demodulation unit 23d corrects the distortion quantity of the bar width of the to-be-demodulated character on the basis of the bar width of the just-before character and thereby demodulates the above character.

Whereas if the difference between the distortion quantities of the bar widths does not fall within the range of the predetermined values, the second demodulation unit 24d corrects the distortion quantity of the bar width on the basis of the bar width of the to-be-demodulated character and thereby demodulates the character.

Note that other configurations are the same as those in the embodiment 6, and hence a detailed explanation thereof will be omitted.

Figure 33:
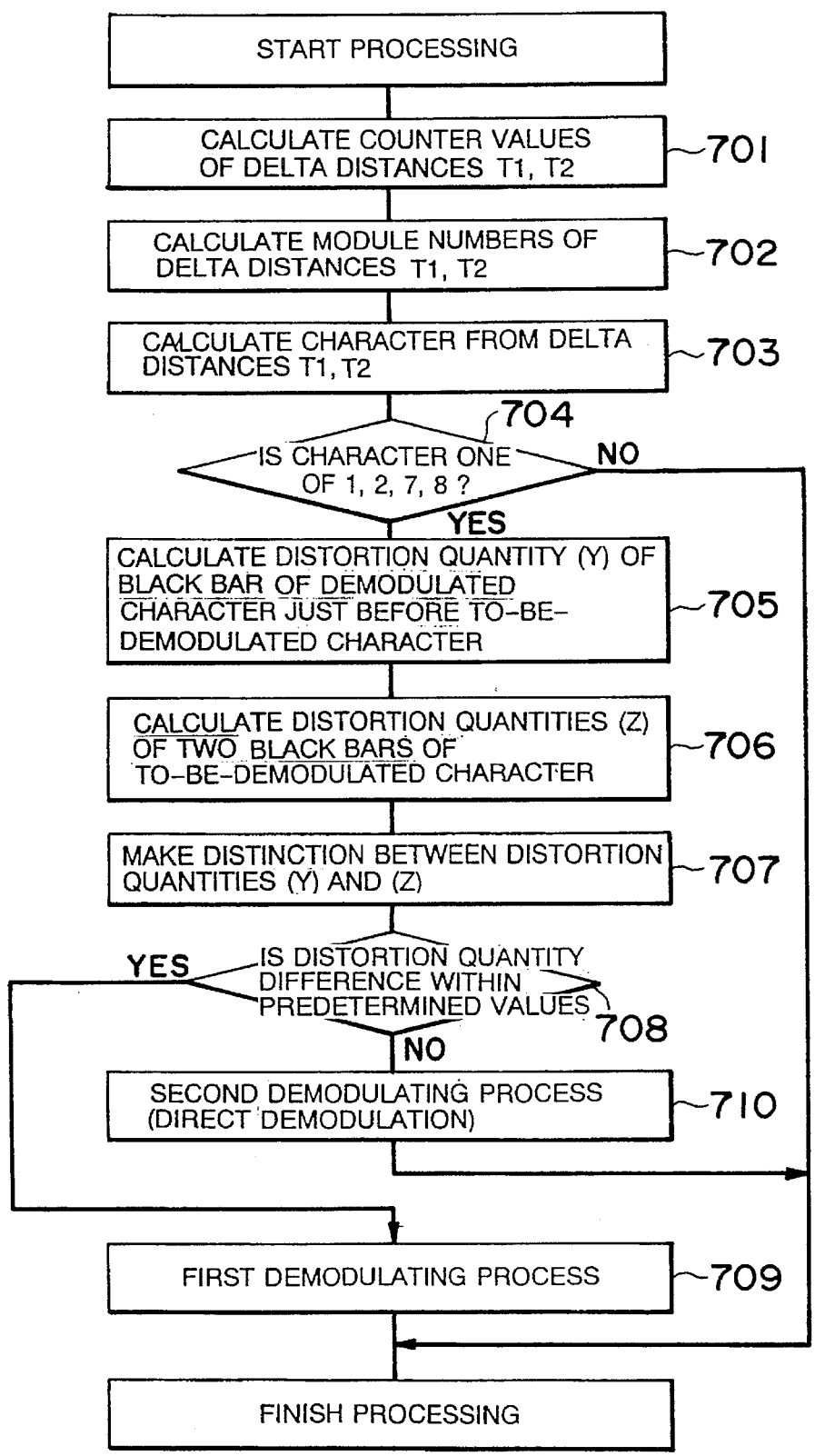
FIG. 33 is a flowchart illustrating the bar code demodulating method in the embodiment 7.

Next, the bar code demodulating method in the embodiment 7 will be explained with reference to a flowchart shown in FIG. 33. To start with, the memory 16 stores the count values of the bar widths, and, therefore, the counter values of the delta distances T1 and T2 are read from the memory 16 to the module number calculation unit 62 (step 701).

Next, the module number calculation unit 62 calculates the number of modules of the delta distances T1 and T2 (step 702). Then, the distance demodulation table 31 serves to calculate the character on the basis of the delta distances T1 and T2 (step 703). The character determining unit 64 determines whether the calculated character is an odd or even numeral among 1, 2, 7 and 8 (step 704).

If the calculated character is the odd or even numeral among 1, 2, 7 and 8, the distortion quantity calculation unit 21c calculates the distortion quantity (Y) of the black bar of the demodulated character adjacent to the character to be corrected (step 705). Next, the distortion quantity calculation unit 21c calculates distortion quantities (Z) of two black bars of the to-be-corrected character (step 706).

Further, the distortion quantity determining unit 22d makes a distinction between the distortion quantity (Y) and the distortion quantities (Z) (step 707). Then, the distortion quantity determining unit 22d determines whether or not a difference between the distortion quantity (Y) and each of the distortion quantities (Z) falls within a range of the predetermined values (step 708).

If the difference between the distortion quantity (Y) and each of the distortion quantities (Z) falls within the range of the predetermined values, the first demodulation unit 23c demodulates the character (step 709).

Whereas if the difference between the distortion quantity (Y) and each of the distortion quantities (Z) does not fall within the range of the predetermined values, the second demodulation unit 24c demodulates the character (step 710).

As discussed above, the first or second demodulation processing is automatically conducted corresponding to the difference in terms of the bar width distortion quantity between the distortion quantity of the bar width of the to-be-demodulated character and the distortion quantity of the bar width of the just-before demodulated character. Accordingly, the accuracy of reading the bar codes can be enhanced.

Figures 34A, 34B:
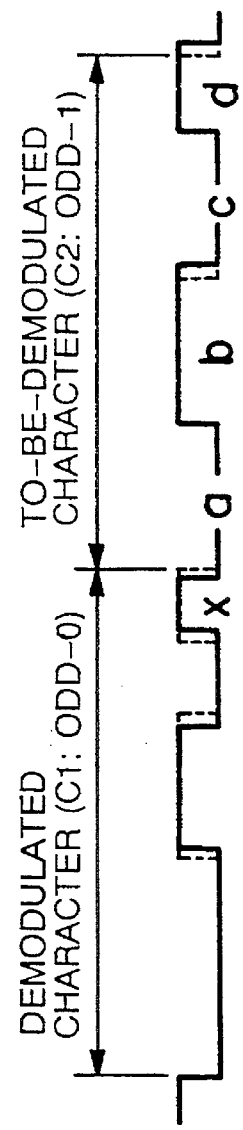
FIG. 34A is a diagram showing how a distinction is made based on a difference between bar width distortions in the embodiment 7.
FIG. 34B is a diagram showing the number of modules of each logic width of the white and black bars of the demodulated character and the to-be-demodulated character.

Given next is a specific example of the embodiment 7. FIG. 34 is a diagram showing a distinction based on the difference between the distortions of the bar widths. As can be known from FIG. 34A, the black x-bar is thin, whereas both of the black b- and d-bars are thick.

Figure 35A:
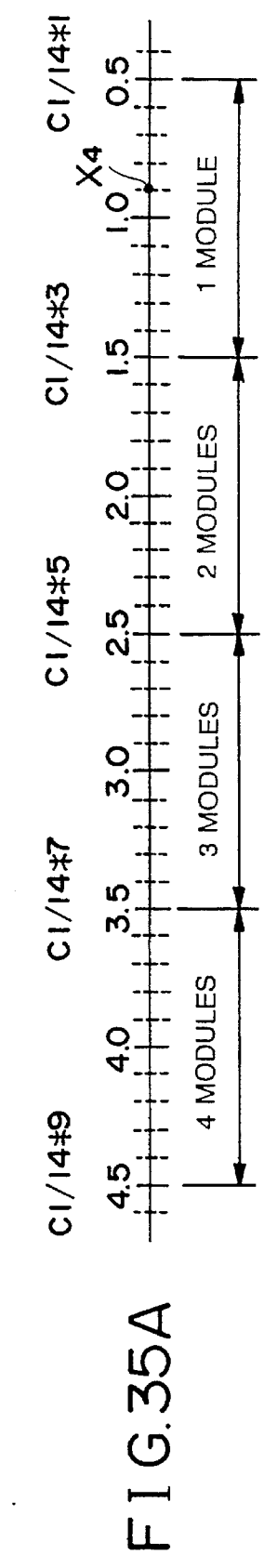
FIG. 35A is a diagram showing the number of modules of the bar width x of the demodulated character shown in FIG. 34A.
Figure 35B:
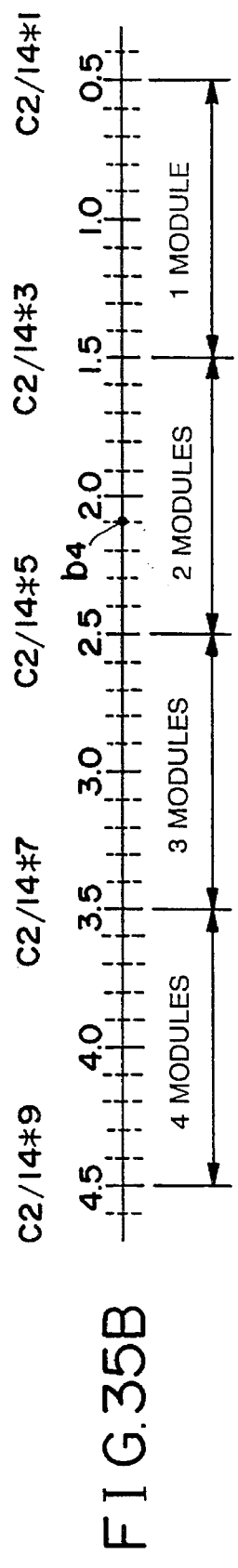
FIG. 35B is a diagram showing the number of modules of the bar width b of the to-be-demodulated character shown in FIG. 34A.
Figure 35C:
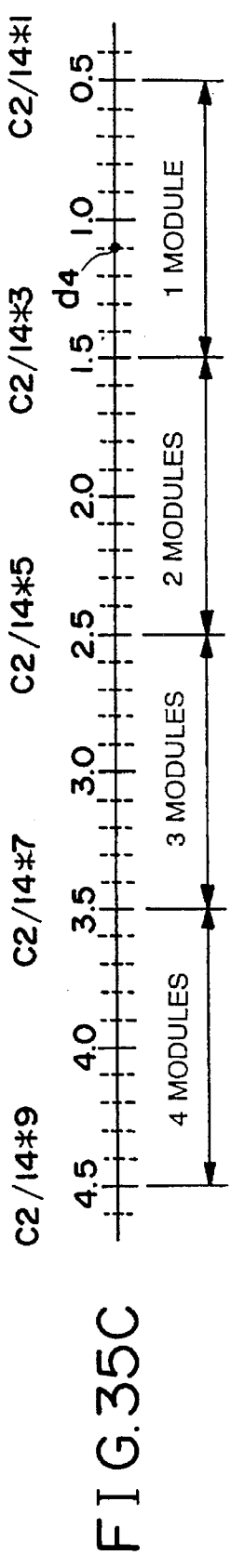
FIG. 35C is a diagram showing the number of modules of the bar width d of the to-be-demodulated character shown in FIG. 34A.

Also, referring to FIG. 35A, the number of modules x4 of the x-bar is 0.9, and therefore its distortion quantity is −0.1. Turning to FIG. 35B, the number of modules b4 of the b-bar is 2.1, and hence a distortion quantity thereof is +0.1. Referring to FIG. 35C, the number of modules d4 of the d-bar is 1.1, and, accordingly, its distortion quantity is +0.1.

Next, the distortion quantity determining unit 22d obtains a difference value between the distortion quantity of the x-bar and the distortion quantity of the b-bar or of the d-bar. For instance, the difference between the distortion quantity of the x-bar and the distortion quantity of the b-bar is 0.2. Further, if the above predetermined value is, e.g., 0.4, the difference value is within the predetermined value. In this case, the first demodulation unit 23d demodulates the character.

Moreover, if the difference value is, e.g., 0.6, the difference value is not within the predetermined value. In such a case, the second demodulation unit 24d demodulates the character. Note that the above predetermined value may be a proper numerical value other than 0.4.

It is apparent that, in this invention, a wide range of different working modes can be formed based on the invention without deviating from the spirit and scope of the invention. This invention is not restricted by its specific working modes except being limited by the appended claims.

What is claimed is:

1. A method of demodulating bar codes, comprising:

a distortion quantity calculating step of calculating a distortion quantity of a bar width of a character to be demodulated by use of bar code data generated by reading the bar codes in which characters are expressed by bar widths;

a distortion quantity determining step of determining whether or not a bar width distortion quantity calculated in said distortion quantity calculating step falls within a range of predetermined values;

a first demodulating step of, when determining that the distortion quantity of the bar width falls within the range of the predetermined values in said distortion quantity determining step, demodulating the character from the bar code data by effecting a first correcting process on the bar width distortion quantity; and a second demodulating step of, when determining that the distortion quantity of the bar width does not fall within the range of the predetermined values in said distortion quantity determining step, demodulating the character from the bar code data by effecting a second correcting process on the distortion quantity of the bar width.

2. A method of demodulating bar codes according to claim 1, further comprising:

a distance demodulating step of demodulating only a character exclusive of specified characters on the basis of a distance between an item of white bar data and an item of black bar data, which are adjacent to each other, of the bar code data composed of plural items of white bar data and plural items of black bar data, wherein said distortion quantity calculating step involves inputting the bar code data of the specified characters.

3. A method of demodulating bar codes according to claim 1 or 2, wherein said distortion quantity calculating step involves calculating a distortion quantity of the bar width of the to-be-demodulated on the basis of the bar width of the already-demodulated character immediately in front of the to-be-demodulated character.

4. A method of demodulating bar codes according to claim 1, wherein said first demodulating step involves demodulating the character by correcting the distortion quantity of the bar width on the basis of the bar width of the already-demodulated character just before the to-be-demodulated character.

5. A method of demodulating bar codes according to claim 1, wherein said second demodulating step involves demodulating the character by correcting the distortion quantity of the bar width on the basis of the bar width of the to-be-demodulated character.

6. A method of demodulating bar codes according to claim 5, wherein said second demodulating step involves measuring a distortion quantity of the bar width of the to-be-demodulated character and, when the distortion quantity falls within the range of the predetermined values, demodulating the character.

7. A method of demodulating bar codes according to claim 1, further comprising:
  a first confirming step of reconfirming, when demodulating the character just before the to-be-demodulated character exhibiting no distortion in said first demodulating step, the just-before demodulated character by use of the to-be-demodulated character with no distortion.

8. A method of demodulating bar codes according to claim 1, further comprising:
  a second confirming step of reconfirming, when demodulating the character just before the to-be-demodulated character exhibiting no distortion in said second demodulating step, the just-before demodulated character by use of the to-be-demodulated character with no distortion.

9. A method of demodulating bar codes according to claim 3, wherein said distortion quantity calculating step involves obtaining a module value by calculating, as a distortion quantity, a difference between the bar width of the just-before already-demodulated character and the bar width of the to-be-demodulated character and, at the same time, dividing the distortion quantity by module widths constituting the character, and
  wherein said distortion determining step involves, when the module value is within upper/lower limit module values of a predetermined fiducial module value, determining that the distortion quantity falls within the range of the predetermined values.

10. A method of demodulating bar codes according to claim 9, wherein the upper/lower module values of the fiducial module value are module values larger and smaller by 0.4 that the fiducial module value.

11. A method of demodulating bar codes according to claim 1 or 2, wherein said distortion quantity calculating step involves calculating a distortion quantity of the bar width of the to-be-demodulated character and, at the same time, calculating a distortion quantity of the bar width of the demodulated character just before the to-be-demodulated character,
  wherein said distortion quantity determining step involves determining positive/negative signs of the calculated distortion quantity of the bar width of the to-be-demodulated character and of the calculated distortion quantity of the bar width of the just-before demodulated character,
  wherein said first demodulating step involves, when the distortion quantity of the bar width of the to-be-demodulated character and the distortion quantity of the bar width of the just-before demodulated character have the same positive/negative signs, demodulating the character by correcting the distortion quantity of the bar width of the to-be-demodulated character on the basis of the bar width of the just-before demodulated character, and
  wherein said second demodulating step involves, when the distortion quantity of the bar width of the to-be-demodulated character and the distortion quantity of the bar width of the just-before demodulated character have different positive/negative signs, demodulating the character by correcting the distortion quantity of the bar width thereof on the basis of the bar width of the to-be-demodulated character.

12. A method of demodulating bar codes according to claim 1 or 2, wherein said distortion quantity calculating step involves calculating the distortion quantity of the bar width of the to-be-demodulated character and, at the same time, calculating the distortion quantity of the bar width of the demodulated character just before the to-be-demodulated character,
  wherein said distortion quantity determining step involves determining whether or not a difference in bar width distortion quantity between the calculated distortion quantity of the bar width of the to-be-demodulated character and the calculated distortion quantity of the bar width of the just-before demodulated character falls within the range of the predetermined values,
  wherein said first demodulating step involves, when the difference between the bar width distortion quantities falls within the range of the predetermined values, demodulating the character by correcting the distortion quantity of the bar width of the to-be-demodulated character on the basis of the bar width of the just-before demodulated character, and
  wherein said second demodulating step involves, when the difference between the bar width distortion quantities does not fall within the range of the predetermined values,demodulating the character by correcting the distortion quantity of the bar width thereof on the basis of the bar width of the to-be-demodulated character.

13. An apparatus for demodulating bar codes, comprising:

distortion quantity calculating means for calculating a distortion quantity of a bar width of a character to be demodulated by use of bar code data generated by reading the bar codes in which characters are expressed by bar widths;

distortion quantity determining means for determining whether or not a bar width distortion quantity calculated by said distortion quantity calculating means falls within a range of predetermined values;

first demodulating means for, when said distortion quantity determining means determines that the distortion quantity of the bar width falls within the range of the predetermined values,demodulating the character from the bar code data by effecting a first correcting process on the bar width distortion quantity; and second demodulating means for, when said distortion quantity determining means determines that the distortion quantity of the bar width does not fall within the range of the predetermined values,demodulating the character from the bar code data by effecting a second correcting process on the distortion quantity of the bar width.

14. An apparatus for demodulating bar codes according to claim 13, further comprising:

a distance demodulation table for demodulating only a character exclusive of specified characters on the basis of a distance between an item of white bar data and an item of black bar data, which are adjacent to each other, of the bar code data composed of plural items of white bar data and plural items of black bar data, wherein said distortion quantity calculating means inputs the bar code data of the specified characters.

15. An apparatus for demodulating bar codes according to claim 13 or 14, further comprising:

an optical device for irradiating the bar codes with the light;

an A/D converter for generating the bar code data by effecting a binary-coding process on the light reflected by the bar codes;

a clock generator for generating a clock signal;

a bar width counter for counting a bar width of the bar code data outputted from said A/D converter by use of the clock signal; and a memory for storing bar width count values counted by said bar width counter.

16. An apparatus for demodulating bar codes according to claim 13, wherein said distortion quantity calculating means calculates a distortion quantity of the bar width of the to-be-demodulated on the basis of the bar width of the already-demodulated character immediately in front of the to-be-demodulated character.

17. An apparatus for demodulating bar codes according to claim 13, wherein said first demodulating means demodulates the character by correcting the distortion quantity of the bar width on the basis of the bar width of the already-demodulated character just before the to-be-demodulated character.

18. An apparatus for demodulating bar codes according to claim 13, wherein said second demodulating means demodulates the character by correcting the distortion quantity of the bar width on the basis of the bar width of the to-be-demodulated character.

19. An apparatus for demodulating bar codes according to claim 18, wherein said second demodulating means measures a distortion quantity of the bar width of the to-be-demodulated character and, when the distortion quantity falls within the range of the predetermined values, demodulates the character.

20. An apparatus for demodulating bar codes according to claim 13, further comprising:

first confirming means for reconfirming, when said first demodulating means demodulates the character just before the to-be-demodulated character exhibiting no distortion, the just-before demodulated character by use of the to-be-demodulated character with no distortion.

21. An apparatus for demodulating bar codes according to claim 20, further comprising:

second confirming means for reconfirming, when said second demodulating means demodulates the character just before the to-be-demodulated character exhibiting no distortion, the just-before demodulated character by use of the to-be-demodulated character with no distortion.

22. An apparatus for demodulating bar codes according to claim 16, wherein said distortion quantity calculating means obtains a module value by calculating, as a distortion quantity, a difference between the bar width of the just-before already-demodulated character and the bar width of the to-be-demodulated character and, at the same time, dividing the distortion quantity by module widths constituting the character, and wherein said distortion determining means, when the module value is within upper/lower limit module values of a predetermined fiducial module value, determines that the distortion quantity falls within the range of the predetermined values.

23. An apparatus for demodulating bar codes according to claim 22, wherein the upper/lower module values of the fiducial module value are module values larger and smaller by 0.4 that the fiducial module value.

24. An apparatus for demodulating bar codes according to claim 13 or 14, wherein said distortion quantity calculating means calculates a distortion quantity of the bar width of the to-be-demodulated character and, at the same time, calculates a distortion quantity of the bar width of the demodulated character just before the to-be-demodulated character, wherein said distortion quantity determining means determines positive/negative signs of the distortion quantity of the bar width of the to-be-demodulated character calculated and of the distortion quantity of the bar width of the just-before demodulated character, wherein said first demodulating means, when the distortion quantity of the bar width of the to-be-demodulated character and the distortion quantity of the bar width of the just-before demodulated character have the same positive/negative signs, demodulates the character by correcting the distortion quantity of the bar width of the to-be-demodulated character on the basis of the bar width of the just-before demodulated character, and wherein said second demodulating means, when the distortion quantity of the bar width of the to-be-demodulated character and the distortion quantity of the bar width of the just-before demodulated character have different positive/negative signs, demodulates the character by correcting the distortion quantity of the bar width thereof on the basis of the bar width of the to-be-demodulated character.

25. An apparatus for demodulating bar codes according to claim 13 or 14, wherein said distortion quantity calculating means calculates the distortion quantity of the bar width of the to-be-demodulated character and, at the same time, calculates the distortion quantity of the bar width of the demodulated character just before the to-be-demodulated character, wherein said distortion quantity determining means determines whether or not a difference in bar width distortion quantity between the distortion quantity, calculated by said distortion quantity calculating means, of the bar width of the to-be-demodulated character and the distortion quantity, calculated by said distortion quantity calculating means, of the bar width of the just before demodulated character falls within the range of the predetermined values, wherein said first demodulating means, when the difference between the bar width distortion quantities falls within the range of the predetermined values, demodulates the character by correcting the distortion quantity of the bar width of the to-be-demodulated character on the basis of the bar width of the just-before demodulated character, and wherein said second demodulating means, when the difference between the bar width distortion quantities does not fall within the range of the predetermined values, demodulates the character by correcting the distortion quantity of the bar width thereof on the basis of the bar width of the to-be-demodulated character.

* * * * *